US012650696B2

(12) United States Patent　(10) Patent No.:　US 12,650,696 B2
Holson et al.　(45) Date of Patent:　Jun. 9, 2026

(54) FORCE MULTIPLYING MOBILE ROBOT

(71) Applicant: Robust AI, Inc., San Carlos, CA (US)

(72) Inventors: Benjie Holson, Sunnyvale, CA (US);
Justine Rembisz, San Carlos, CA (US);
Heather Klaubert, San Jose, CA (US);
Jamie Luong, San Mateo, CA (US);
Anthony Jules, Hillsborough, CA (US);
Rodney Brooks, San Francisco, CA
(US)

(73) Assignee: Robust AI, Inc., San Carlos, CA (US)

( * ) Notice: Subject to any disclaimer, the term of this
patent is extended or adjusted under 35
U.S.C. 154(b) by 64 days.

(21) Appl. No.: 18/671,638

(22) Filed: May 22, 2024

(65) Prior Publication Data

US 2025/0278087 A1　Sep. 4, 2025

Related U.S. Application Data

(60) Provisional application No. 63/560,381, filed on Mar.
1, 2024.

(51) Int. Cl.
*G05D 1/241*　(2024.01)
*B25J 9/16*　(2006.01)

(52) U.S. Cl.
CPC ............ *G05D 1/241* (2024.01); *B25J 9/1633*
(2013.01); *B25J 9/1666* (2013.01)

(58) Field of Classification Search
None
See application file for complete search history.

(56) References Cited

U.S. PATENT DOCUMENTS

| | | | |
|---|---|---|---|
| 4,028,135 A | 6/1977 | Vig | |
| 6,408,230 B2 | 6/2002 | Wada | |

(Continued)

FOREIGN PATENT DOCUMENTS

| | | | | |
|---|---|---|---|---|
| CN | 110509991 | | 11/2019 | |
| DE | 102012017328 B4 | * | 8/2016 | ............. G01G 21/00 |

(Continued)

OTHER PUBLICATIONS

Fei Shi, Qixin Cao, Chuntao Leng and Hongbing Tan, "Based on
force sensing-controlled human-machine interaction system for
walking assistant robot," 2010 8th World Congress on Intelligent
Control and Automation, Jinan, 2010 (Year: 2010).*

(Continued)

*Primary Examiner* — Jason Holloway
*Assistant Examiner* — Bryant Tang
(74) *Attorney, Agent, or Firm* — Polygon IP, LLP

(57)　ABSTRACT

A mechanical drive unit for a robot may be controlled by
receiving from a force sensor an input message character-
izing a physical force exerted on the force sensor in a first
direction. A physical force input vector may be determined
based on the input message and quantifying the physical
force in two or more dimensions. A force output vector
aggregating the physical force input vector and a second
force input vector and quantifying a force to apply to move
the robot in a second direction may be determined at least in
part by applying a force multiplier multiplying the physical
force input vector. An indication of the force output vector
may be transmitted to the omnidirectional mechanical drive
unit via a communication interface. The robot may be
moved via the mechanical drive unit in the second direction
based on the force output vector.

18 Claims, 18 Drawing Sheets

(56) References Cited

U.S. PATENT DOCUMENTS

| | | | |
|---|---|---|---|
| 6,853,877 | B1 | 2/2005 | Slater |
| 6,865,446 | B2 | 3/2005 | Yokono |
| 6,925,679 | B2 | 8/2005 | Wallach |
| 8,428,781 | B2 | 4/2013 | Chang |
| 8,909,370 | B2 | 12/2014 | Stiehl |
| 9,757,486 | B2 | 9/2017 | Dobrinsky |
| 10,279,476 | B2 | 5/2019 | Jaekel |
| 10,793,291 | B2 | 10/2020 | Brown |
| 10,919,555 | B1 | 2/2021 | Spruill |
| 10,954,067 | B1 | 3/2021 | Theobald |
| 11,099,562 | B1 | 8/2021 | Ebrahimi Afrouzi |
| 11,548,159 | B1 | 1/2023 | Ebrahimi Afrouzi |
| 11,858,573 | B2 | 1/2024 | Lee |
| 2007/0080000 | A1 | 4/2007 | Tobey |
| 2008/0106374 | A1 | 5/2008 | Sharbaugh |
| 2008/0197226 | A1 | 8/2008 | Cooper |
| 2010/0234993 | A1 | 9/2010 | Seelinger |
| 2011/0098855 | A1 | 4/2011 | Kurth |
| 2012/0305787 | A1 | 12/2012 | Henson |
| 2013/0008734 | A1 | 1/2013 | Swasey |
| 2015/0088310 | A1 | 3/2015 | Pinter |
| 2015/0125252 | A1 | 5/2015 | Berzen Ratzel |
| 2016/0271803 | A1 | 9/2016 | Stewart |
| 2016/0317690 | A1 | 11/2016 | Dayton |
| 2016/0354931 | A1 | 12/2016 | Jones |
| 2017/0001656 | A1 | 1/2017 | Katayama |
| 2017/0049915 | A1 | 2/2017 | Brais |
| 2017/0080117 | A1 | 3/2017 | Gordon |
| 2017/0097232 | A1 | 4/2017 | Anderson-Sprecher |
| 2017/0128136 | A1* | 5/2017 | Post ....................... A61B 34/30 |
| 2017/0246331 | A1 | 8/2017 | Lloyd |
| 2018/0001946 | A1 | 1/2018 | Yokoya |
| 2018/0101179 | A1 | 4/2018 | Louey |
| 2018/0104368 | A1 | 4/2018 | Dobrinsky |
| 2018/0116479 | A1 | 5/2018 | Gilbert, Jr. |
| 2018/0127009 | A1 | 5/2018 | Collins |
| 2018/0161986 | A1 | 6/2018 | Kee |
| 2018/0354539 | A1 | 12/2018 | Casey |
| 2019/0217477 | A1 | 7/2019 | Paepcke |
| 2019/0219409 | A1 | 7/2019 | Tan |
| 2019/0224853 | A1 | 7/2019 | Gewecke |
| 2019/0270375 | A1 | 9/2019 | Newell |
| 2020/0061839 | A1 | 2/2020 | Deyle |
| 2020/0086487 | A1 | 3/2020 | Johnson |
| 2020/0094418 | A1 | 3/2020 | Mika |
| 2020/0148520 | A1 | 5/2020 | Luo |
| 2020/0164737 | A1 | 5/2020 | Kozlenok |
| 2020/0189120 | A1 | 6/2020 | Weaver |
| 2020/0262460 | A1 | 8/2020 | Kim |
| 2020/0316786 | A1 | 10/2020 | Galluzzo |
| 2020/0346352 | A1 | 11/2020 | Kim |
| 2020/0401133 | A1 | 12/2020 | Armbrust |
| 2021/0011484 | A1 | 1/2021 | Park |
| 2021/0028233 | A1 | 1/2021 | Forrest |
| 2021/0046650 | A1 | 2/2021 | Deyle |
| 2021/0053207 | A1 | 2/2021 | Romanov |
| 2021/0061352 | A1 | 3/2021 | Lee |
| 2021/0070339 | A1 | 3/2021 | Delgatty |
| 2021/0122033 | A1 | 4/2021 | Skaaksrud |
| 2021/0138912 | A1 | 5/2021 | Yamasaki |
| 2021/0155464 | A1 | 5/2021 | Takai |
| 2021/0178001 | A1 | 6/2021 | Bonutti |
| 2021/0179403 | A1 | 6/2021 | Nakamura |
| 2021/0232148 | A1 | 7/2021 | Sui |
| 2021/0259497 | A1 | 8/2021 | Park |
| 2021/0276805 | A1 | 9/2021 | Rongley |
| 2021/0379952 | A1 | 12/2021 | Zhou |
| 2022/0088237 | A1 | 3/2022 | Hauser |
| 2022/0194763 | A1 | 6/2022 | Canuto Gil |
| 2023/0050980 | A1 | 2/2023 | Zahdeh |
| 2023/0101404 | A1 | 3/2023 | Lee |
| 2023/0168679 | A1 | 6/2023 | Brooks |
| 2023/0191589 | A1 | 6/2023 | Lee |
| 2023/0302643 | A1* | 9/2023 | Joly ........................ B25J 18/04 |
| 2024/0004391 | A1 | 1/2024 | Galluzzo |
| 2024/0210260 | A1* | 6/2024 | Lu ............................ G01L 1/16 |

FOREIGN PATENT DOCUMENTS

| | | |
|---|---|---|
| EP | 3660619 | 6/2020 |
| EP | 3915856 | 12/2021 |
| EP | 4067205 | 10/2022 |
| EP | 4102331 | 12/2022 |
| JP | 2018140692 A | 9/2018 |
| JP | 2021175631 | 11/2021 |
| JP | 2022092759 A * | 6/2022 |
| KR | 20180067467 | 6/2018 |
| WO | 2018039337 | 3/2018 |
| WO | 2018211481 | 11/2018 |
| WO | 2018233853 A1 | 12/2018 |
| WO | 2018233858 A1 | 12/2018 |
| WO | 2019020861 | 1/2019 |
| WO | 2022107000 | 5/2022 |
| WO | 2023102319 | 6/2023 |

OTHER PUBLICATIONS

English translation of JP-2022092759-A (wherein the paragraph numbering provided coincides with any relevant citations to this reference within the accompanying Office Action) (Year: 2022).*

English translation of DE-102012017328-B4 (wherein the paragraph numbering provided coincides with any relevant citations to this reference within the accompanying Office Action) (Year: 2016).*

Costa et al., "Designing for Uniform Mobility Using Holonomicity,"2017 IEEE International Conference on Robotics and Automation (ICRA) Singapore, May 29-Jun. 3, 2017.

Huang, Feixiang; Robotic Delivery System for Material Handling [Master's Thesis, University of Akron], Dec. 2014.

Jones et al., "Design and Evaluation of Magnetic Hall Effect Tactile Sensors for Use in Sensorized Splints," Sensors, Feb. 19, 2020, 20, 1123.

Int'l Application Serial No. PCT/US21/24416, Int'l Search Report and Written Opinion mailed Jun. 10, 2021.

Int'l Application Serial No. PCT/US22/79883 Int'l Search Report and Written Opinion mailed Feb. 3, 2023.

Mobile Autonomous Robotic Cart 3 Series Overview, 3 Series Data Sheet v220301A, retrieved on Jul. 22, 2022, https://www.multechnologies.com/hubfs/manuals/MARC_3_Series_data_sheet_2203a.pdf.

Nasab et al., "Design and development of a multi-axis force sensor based on the hall effect with decouple structure," Mechatronics, vol. 84, Jun. 2022.

Nie et al., "A Soft Four Degree-of-Freedom Load Cell Based on the Hall Effect," IEEE Sensors Journal, vol. 17, No. 22, Nov. 15, 2017.

Office Action (Non-Final Rejection) dated Feb. 10, 2023 for U.S. Appl. No. 17/207,195 (pp. 1-18).

Office Action (Non-Final Rejection) dated Sep. 14, 2023 for U.S. Appl. No. 17/207,204 (pp. 1-21).

Office Action (Non-Final Rejection) dated Sep. 28, 2023 for U.S. Appl. No. 17/208,672 (pp. 1-15).

Office Action (Non-Final Rejection) dated Dec. 19, 2023 for U.S. Appl. No. 17/538,668 (pp. 1-31).

Office Action (Notice of Allowance and Fees Due (PTOL-85)) dated Mar. 4, 2024 for U.S. Appl. No. 17/208,672 (pp. 1-9).

Office Action (Notice of Allowance and Fees Due (PTOL-85)) dated Jun. 12, 2023 for U.S. Appl. No. 17/207,195 (pp. 1-8).

Office Action (Notice of Allowance and Fees Due (PTOL-85)) dated Jul. 2, 2024 for U.S. Appl. No. 17/538,668 (pp. 1-8).

Office Action dated May 22, 2024 for U.S. Appl. No. 18/622,640 (pp. 1-13).

Rakovic et al., "3-Axis Contact Force Fingertip Sensor Based on Hall Effect Sensor," Advances in Robot Design and Intelligent Control. RAAD, Nov. 2016.

Scholz, Jonathan et al; Cart Pushing with a Mobile Manipulation System: Towards Navigation with Moveable Objects, retrieved on Jul. 7, 2022, https://www.cs.cmu.edu/~maxim/files/cartplanner_icra11.pdf.

(56)                References Cited

OTHER PUBLICATIONS

Shenawy et al., "Comparing Different Holonomic Mobile Robots," Oct. 2007 IEEE International Conference on Systems, Man and Cybernetics, Montreal, QC, Canada, pp. 1584-1589.

Temizer et al., "Holonomic planar motion from non-holonomic driving mechanisms: The Front-Point Method," Proc. SPIE 4573, Mobile Robots XVI, (Feb. 18, 2002).

Tomo et al., "Design and Characterization of a Three-Axis Hall Effect-Based Soft Skin Sensor," Sensors, Apr. 7, 2016; 16(4):491.

Tomo et al., "Development of a Hall-Effect Based Skin Sensor," IEEE Sensors, Busan, Korea (South), Nov. 1-4, 2015.

Wada et al., "Caster Drive Mechanisms for Holonomic and Omni-directional Mobile Platforms with no Over Constraint," Proceedings of the 2000 IEEE International Conference on Robotics & Automation San Francisco, CA Apr. 2000.

Wang, Ziyu; Autonomous Robotic Cart for Food Delivery on Airplane, [Master's Thesis, NYU Tandon School of Engineering], Fall 2017, retrieved on Jul. 22, 2022 http://engineering.nyu.edu/mechatronics/projects/MSprojects/2017-2018/4/report.pdf.

English WIPO translation of JP-2018140692-A, Year: 2018 (pp. 1-24).

European Application Serial No. 22902309.8, Search Report and Written Opinion mailed Oct. 1, 2025, 10 pgs.

International Application No. PCT/US25/17483, Search Report and Written Opinion mailed Jul. 1, 2025 (pp. 1-17).

International Application Serial No. PCT/US22/79883, Search Report and Written Opinion mailed Feb. 3, 2023, 10 pgs.

International Application Serial No. PCT/US25/017472, Search Report and Written Opinion mailed Jun. 11, 2025, 16 pgs.

International Application Serial No. PCT/US25/017476, Search Report and Written Opinion mailed Jun. 11, 2025, 16 pgs.

Notice of Allowance dated May 22, 2025 for U.S. Appl. No. 18/795,630 (pp. 1-15).

Notice of Allowance dated Jun. 20, 2025 for U.S. Appl. No. 18/819,180 (pp. 1-8).

Notice of Allowance dated Aug. 6, 2025 for U.S. Appl. No. 18/795,630 (pp. 1-2).

Notice of Allowance dated Sep. 18, 2024 for U.S. Appl. No. 18/622,640 (pp. 1-10).

Office Action dated Oct. 18, 2024 for U.S. Appl. No. 18/795,630 (pp. 1-14).

Office Action dated Oct. 23, 2024 for U.S. Appl. No. 18/819,180 (pp. 1-16).

* cited by examiner

106

104

108

102

110

100

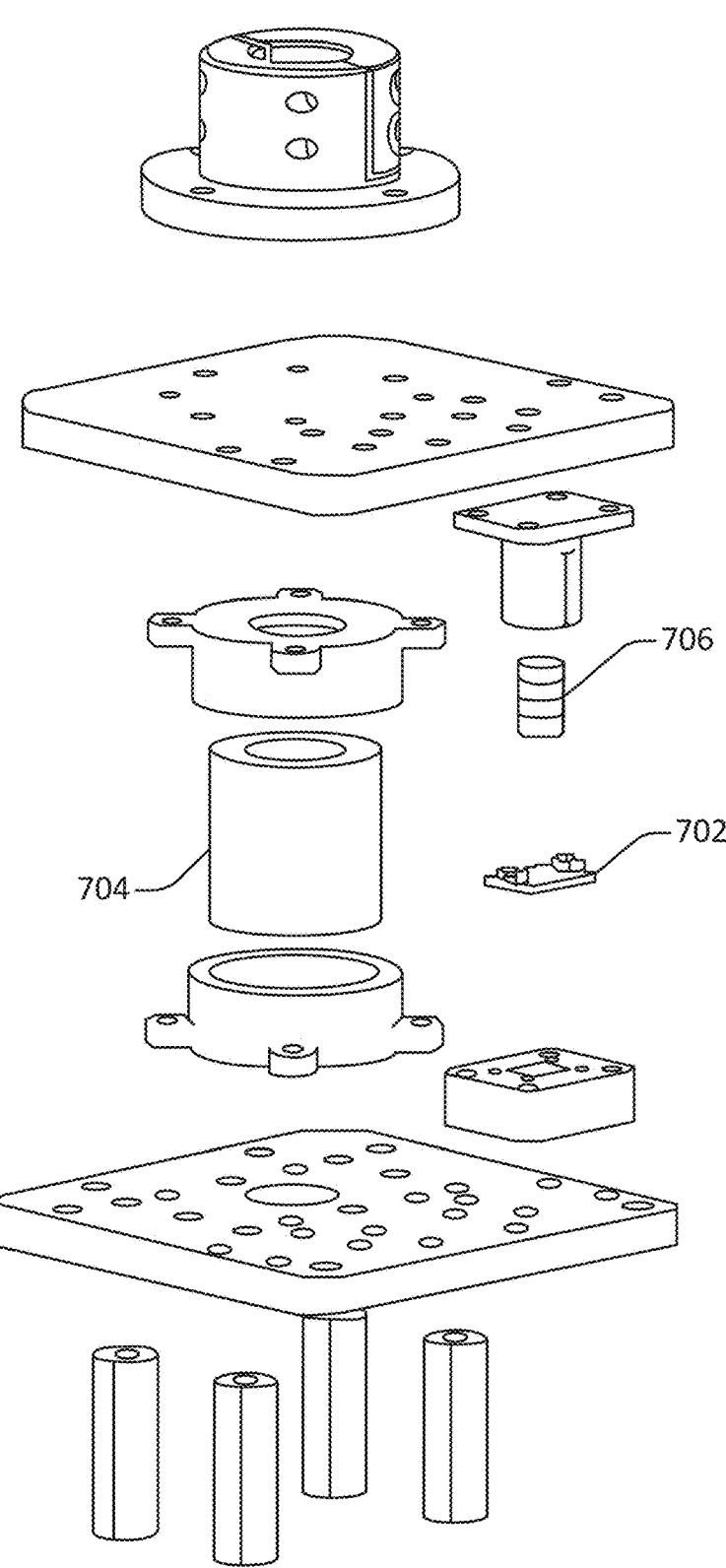
Figure 7
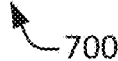

900

900

900

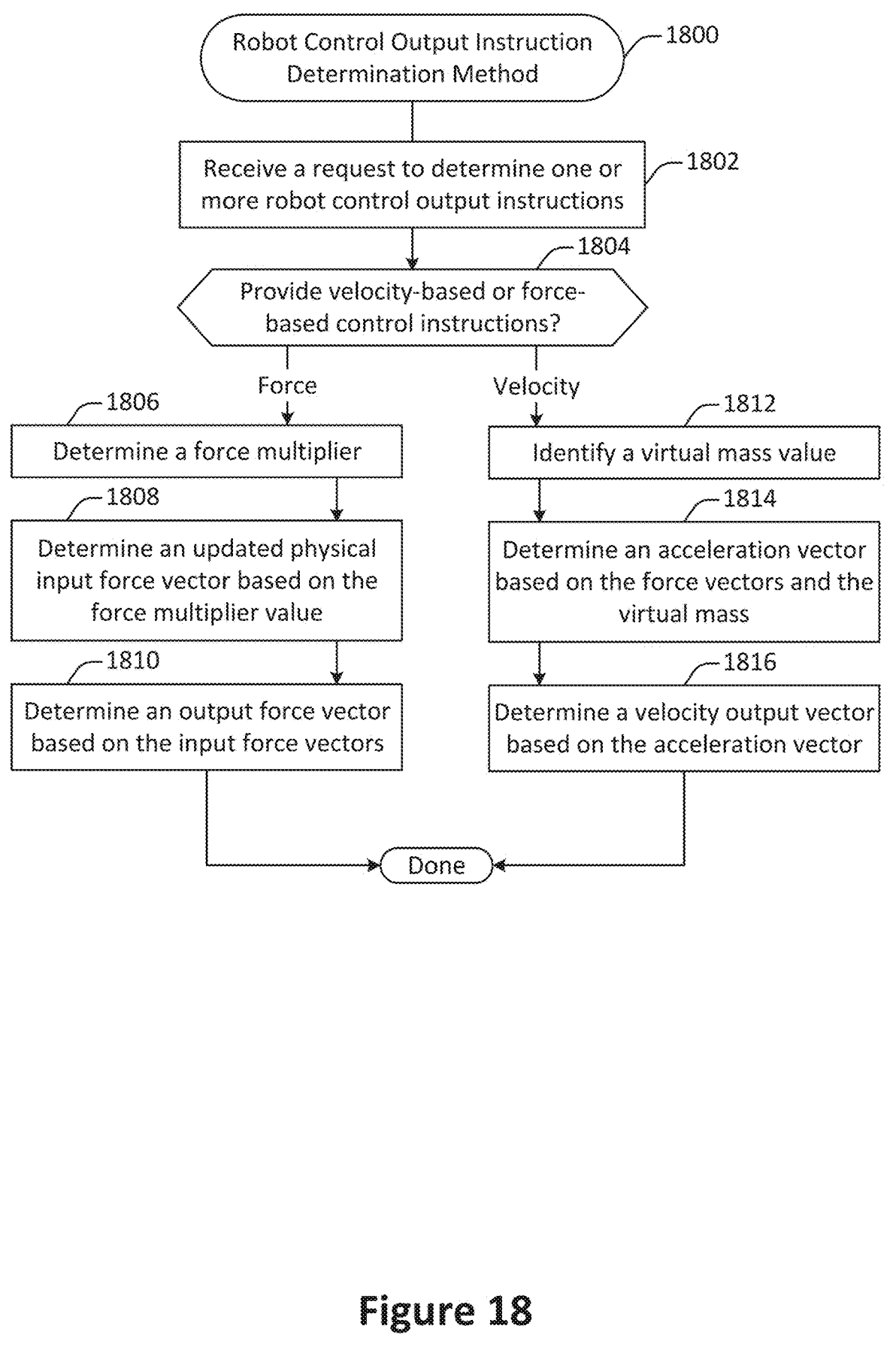

Robot Control Output Instruction Determination Method ⎯1800

Receive a request to determine one or more robot control output instructions ⎯1802

Provide velocity-based or force-based control instructions? ⎯1804

Force                    Velocity

⎯1806
Determine a force multiplier

⎯1808
Determine an updated physical input force vector based on the force multiplier value ⎯1810
Determine an output force vector based on the input force vectors ⎯1812
Identify a virtual mass value ⎯1814
Determine an acceleration vector based on the force vectors and the virtual mass ⎯1816
Determine a velocity output vector based on the acceleration vector Done

Figure 18

FORCE MULTIPLYING MOBILE ROBOT

CROSS-REFERENCE TO RELATED APPLICATIONS

This application claims the benefit under 35 U.S.C. § 119(e) of U.S. Provisional Patent Application 63/560,381 by Jules et al., titled "AUTONOMOUS MOBILE ROBOT", filed on Mar. 1, 2024, which is incorporated herein by reference in its entirety and for all purposes.

FIELD OF TECHNOLOGY

This patent application relates generally to robotics, and more specifically to control processes and mechanisms for mobile robots.

BACKGROUND

Autonomous and semi-autonomous robots can be operated without user input, but in some situations user operation is desirable. User operation of autonomous and semi-autonomous robots may be achieved through a control interface, such as a graphical user interface to allow a user to control the autonomous or semi-autonomous robot from the point of view of the robot. However, autonomous and semi-autonomous robots may operate in environments with other human workers. Such workers may not be specifically tasked with operating the autonomous and semi-autonomous robots and may not include specific devices to do so, but may still find themselves in situations where they may need to operate such autonomous and semi-autonomous robots. Accordingly, improved techniques for controlling robots are desired.

SUMMARY

Techniques and mechanisms described herein provide systems, methods, and non-transitory computer readable media having instructions stored thereon for controlling a robot including a mechanical drive unit, which may be omnidirectional, backdrivable, and/or holonomic. In some embodiments, an input message characterizing a physical force exerted on a force sensor in a first direction may be received from the force sensor. A physical force input vector quantifying the physical force in two or more dimensions may be determined based on the input message. A force output vector aggregating the physical force input vector and a second force input vector and quantifying a force to apply to move the robot in a second direction may be determined. Determining the force output vector may include applying a force multiplier multiplying the physical force input vector. An indication of the force output vector may be transmitted to the omnidirectional mechanical drive unit via a communication interface. The robot may be moved via the mechanical drive unit in the second direction based on the force output vector.

In some embodiments, the second force input vector may include a friction force input vector characterizing a virtual frictional force exerted in a third dimension opposing the first direction.

In some embodiments, the second force input vector may include a functional force input vector characterizing a virtual functional force to be exerted on the robot in a third direction based on one or more instructions.

In some embodiments, the second force input vector may include a virtual force exerted in a third direction opposing an obstacle located in a physical environment in which the robot is situated. The obstacle may be detected based on sensor data received from one or more sensors located at the robot.

In some embodiments, the second force input vector may include a virtual force exerted in a third direction along a path determined based on an instruction received from a remote computing system. Alternatively, or additionally, the second force input vector may include a virtual force exerted in a third direction toward a location in a physical environment in which the robot is situated.

In some embodiments, transmitting the indication of the force output vector to the omnidirectional mechanical drive unit may include transmitting the force output vector to the omnidirectional mechanical drive unit. Determining the force output vector may involve summing the second force input vector and a dot product of the physical force input vector and the force multiplier.

In some implementations, transmitting the indication of the force output vector to the omnidirectional mechanical drive unit may include determining a velocity output vector based on an existing velocity vector for the robot. The velocity output vector may identify a target velocity to be achieved by the omnidirectional mechanical drive unit. Determining the force output vector may involve dividing a sum of the second force input vector and the physical force input vector by the force multiplier, where the force multiplier indicates a virtual mass for the robot.

In some embodiments, the force sensor is communicably coupled with a handlebar attached to the robot and oriented in a vertical direction. Alternatively, or additionally, the force sensor may include a Hall effect sensor configured to detect a change in a magnetic field.

In some implementations, the two or more dimensions include two translational dimensions along a planar surface orthogonal to gravity.

In some embodiments, the force multiplier is a function that receives as input information determined based on the physical force input vector. Alternatively, or additionally, the force multiplier is a vector in the two or more dimensions.

In some implementations, determining the force output vector involves determining a velocity vector including one or more velocity values each characterizing a current velocity of the robot in a respective dimension, identifying a designated dimension in which the current velocity of the robot is directionally opposed to the physical force input vector based on the velocity vector, and increasing the force multiplier in the designated dimension.

BRIEF DESCRIPTION OF THE DRAWINGS

The included drawings are for illustrative purposes and serve only to provide examples of possible structures and operations for the disclosed inventive systems, apparatus, methods, and computer program products for robotic motor control. These drawings in no way limit any changes in form and detail that may be made by one skilled in the art without departing from the spirit and scope of the disclosed implementations.

FIG. 7 illustrates a force sensor, configured in accordance with one or more embodiments.

FIG. 18 illustrates a method for determining a robot control output instruction, performed in accordance with one or more embodiments.

DETAILED DESCRIPTION

Introduction

Figure 1:
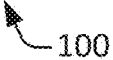
FIG. 1 illustrates an autonomous mobile robot, configured in accordance with one or more embodiments.

Techniques and mechanisms described herein provide for control of a robot, which may be one or more of omnidirectional, holonomic, backdrivable, and autonomous. Input may be received from a force sensor identifying a force exerted on the force sensor in one direction. Based on this input, a physical input force vector quantifying a force exerted on the force sensor in two or more dimensions may be determined. A force output vector may be determined by combining the physical input force vector with a second force input vector. The force output vector may quantify a force to apply to move the robot in another direction. The second force input vector may include, for instance, a frictional force and/or a functional force determined based on one or more operational objectives. The force output vector may include a force multiplier multiplying the physical force exerted on the force sensor. An indication of the force output vector may be sent to a mechanical drive unit at the robot and then used to direct the movement of the robot via the mechanical drive unit.

Techniques and mechanisms described herein provide for an autonomous mobile robot configured to operate in cooperation with people. An autonomous mobile robot may be configured as a cart capable of transporting one or more objects. The robot may operate in one of various modes. For example, in an autonomous mode the robot may operate without physical human intervention, for instance autonomously moving from one location to another and/or performing various types of tasks. As another example, in a robot-guided mode, the robot may direct a human to perform a task, such as guiding a human from one location to another. As another example, in a person-guided mode, the robot may operate in a manner responsive to human guidance. The robot may be configured to seamlessly switch between such modes, for instance with the aid of computer vision, user interaction, and/or artificial intelligence.

In some embodiments, an autonomous mobile robot may be configured for operation in a warehouse environment. For example, the robot may be equipped and configured to perform and support warehouse operations such as item picking, item transport, and item replenishment workflows. As another example, the robot may be equipped to perform automated item pickup and/or dropoff, for instance via one or more arms or conveyer belts. As still another example, the robot may be equipped to perform automated charging and/or battery swapping. As yet another example, the robot may be equipped to autonomously navigate to a particular location, follow a user, respond to user instructions, amplify a force exerted on the robot by a user, and/or perform other types of operations. The robot may be adapted to site-specific environmental conditions and/or processes.

In some embodiments, an autonomous mobile robot configured in accordance with one or more embodiments may support omnidirectional movement. That is, the autonomous mobile robot may be capable of movement in any direction.

In some embodiments, an autonomous mobile robot configured in accordance with one or more embodiments may support holonomic movement. That is, the autonomous mobile robot may be capable of powered movement in any direction corresponding with a degree of freedom associated with the robot. For instance, a conventional automobile is not holonomic because it has three motion degrees of freedom (i.e., x, y, and orientation) but only two controllable degrees of freedom (i.e., speed and steer angle). In contrast, a conventional train is holonomic because has one controllable degree of freedom (i.e., speed) and one motion degree of freedom (i.e., position along the track).

In some embodiments, an autonomous mobile robot configured in accordance with one or more embodiments may support omnidirectional and holonomic movement. That is, the autonomous mobile robot may be capable of powered movement and rotation in any direction from any position.

When using conventional techniques and mechanisms, onboarding autonomous mobile robots in an industrial setting takes a significant amount of time. In contrast, various embodiments described herein facilitate rapid onboarding. In some embodiments, an autonomous mobile robot can be on-boarded without bringing an autonomous mobile robot on-site for an initial survey. Such rapid deployment can significantly increase adoption speed.

When using conventional techniques and mechanisms, even small changes to autonomous mobile robot configuration and workflows cannot be made in real time. In contrast, various embodiments described herein provide for easy adjustments to daily workflows without intervention by a technical support team.

When using conventional techniques and mechanisms, industrial autonomous mobile robots are typically configured with expensive hardware that is customized to particular environments. In contrast, various embodiments described herein provide for autonomous mobile robots may be configured with standardized hardware and software that is easily and cheaply applicable and adaptable to a range of environments.

When using conventional techniques and mechanisms, industrial autonomous mobile robots avoid people and typically treat them like objects. In contrast, various embodiments described herein provide for autonomous mobile robots that employ semantic perception to differentiate people from static objects and move around them intelligently. An autonomous mobile robot may thus perform and/or facilitate human-centric operations such as zone picking, human following, wave picking, a virtual conveyer belt, and user training. Such operations can increase human engagement and reduce the autonomous mobile robot's impact on foot traffic, for instance when its work is unrelated to people nearby.

When using conventional techniques and mechanisms, industrial autonomous mobile robots are difficult to troubleshoot, requiring trained employees or remote support resources to resolve issues. In contrast, various embodiments described herein provide for issue resolution by individuals using the autonomous mobile robots rather than experts with specialized training.

When using conventional techniques and mechanisms, industrial autonomous mobile robots typically provide limited interaction mechanisms. In contrast, various embodiments described herein provide for various types of user interaction mechanisms. For example, a user may interact with the autonomous mobile robot via a touch screen display and force-sensitive handlebars. Using such techniques, individuals may perform tasks such as moving heavy loads, teaching a fleet of autonomous mobile robots about new locations, and resolving issues without interacting with technical support services.

When using conventional techniques and mechanisms, autonomous mobile robots operate using centralized and cloud computing system architectures that increase cost and latency to the robots' ability to respond to rapidly changing warehouse environments. In contrast, various embodiments described herein provide for arms that employ localized processing systems such as neural network architectures. Such approaches provide for lower latency and improved performance, increasing the safety of the autonomous mobile robot and rendering it more responsive to both people and potential hazards in a physical environment.

When using conventional techniques and mechanisms, many industrial autonomous mobile robots rely on expensive LIDAR sensors that observe only a narrow slice of the surrounding environment in limited detail. In contrast, various embodiments described herein provide for autonomous mobile robots with detailed, three-dimensional views of the surrounding environment. Such configurations provide for greater safety, smarter movement and coordination, and deeper data-enabled interactions.

When using conventional techniques and mechanisms, autonomous mobile robots and automated guided vehicles treat people and dynamic objects (e.g., forklifts) as static obstacles to be avoided. In contrast, various embodiments described herein provide for autonomous mobile robots that differentiate between persistent, temporary, and in-motion objects, interacting with them fluidly and efficiently.

When using conventional techniques and mechanisms, an autonomous mobile robot cannot visually distinguish between different individuals. In contrast, various embodiments described herein provide for autonomous mobile robots that can respond to requests from particular individuals and navigate around an environment in more fluid, less disruptive ways. For instance, an autonomous mobile robot may be configured to follow a particular person around a warehouse environment upon request.

Overall Architecture

FIG. 1 illustrates an autonomous mobile robot 100, configured in accordance with one or more embodiments. The autonomous mobile robot 100 includes a base 102, a chassis 104, a sensor unit 106, a user interaction unit 108, and a communication channel 110.

According to various embodiments, the base unit 102 may be configured with an omnidirectional and/or holonomic drive unit. The drive unit may include elements such as one or more wheels, treads, motors, controllers, batteries, and/or other components. In some configurations, the base unit 102 may include a force sensor such as a whole-robot force sensor. Alternatively, or additionally, such a force sensor may be included in a different portion of the autonomous mobile robot 100, such as within the user interaction unit 108. The base unit 102 may also include a bump sensor.

According to various embodiments, the chassis 104 may include one or more rigid members providing physical support and connection between and among other components of the robots. For instance, the chassis 104 may be composed of one or more rods, shelves, bins or other elements. In some configurations, some or all of the chassis 104 may be composed of components from standardized shelving units or carts.

According to various embodiments, various types and configurations of chassis may be used. In some embodiments, the chassis may be composed in part of a commodity shelving unit. For instance, in some configurations the commodity shelving unit may be 48 inches long, 18 inches wide, and 73 inches tall.

According to various embodiments, the sensor unit 106 may include one or more sensors configured to sense the physical environment in which the autonomous mobile robot 100 is situated. For instance, the sensor unit 106 may include four visible light cameras arranged with one on each of four sides of the robot providing 360-degree or near 360-degree visual coverage. Depending on the configuration, various numbers and types of sensors may be employed. Examples of such sensors may include, but are not limited to: visible light cameras, infrared cameras, time-of-flight depth sensors, structured light depth sensors, RADAR sensors, LIDAR sensors, microphones, and chemical sensors. In addition to one or more sensors, the sensor unit 106 may include other elements such as one or more autonomous mobile robot controllers or computing units, one or more communication interfaces for communicating with other computing devices, and/or one or more digital display screens for displaying information.

According to various embodiments, the user interaction unit 108 may include one or more elements for facilitating user interaction. For example, the user interaction unit 108 may include a display (e.g., a touch-screen display) for presenting information and/or receiving user input. As another example, the user interaction unit 108 may include a force-sensitive handlebar configured to force exerted on the handlebar. The force detected may include degree, direction, and/or rotational elements. As still another example, the user interaction unit 108 may include a barcode scanner or other sensor.

According to various embodiments, the communication channel 110 may include one or more cables and/or busses for transmitting power, sensor data, instructions, and/or other electronic signals between different components of the robot. For instance, the communication channel 110 may include routing for accessor cables, lighting, put-to-light taps, pick-from-light taps, and/or other components.

It should be noted that FIG. 1 illustrates only one example of a configuration of an autonomous mobile robot. However, an autonomous mobile robot may be configured in a different manner in accordance with one or more embodiments. For example, an autonomous mobile robot may include more than one handlebar. As another example, a handlebar may be configured in a different orientation, such as a vertical orientation. As another example, a handlebar may be integrated into the chassis. As still another example, one or more elements of the sensor unit may be distributed elsewhere on the chassis 104 or base unit 102. As yet another example, the chassis may be arranged with different configurations of shelving or other components.

Figure 2:
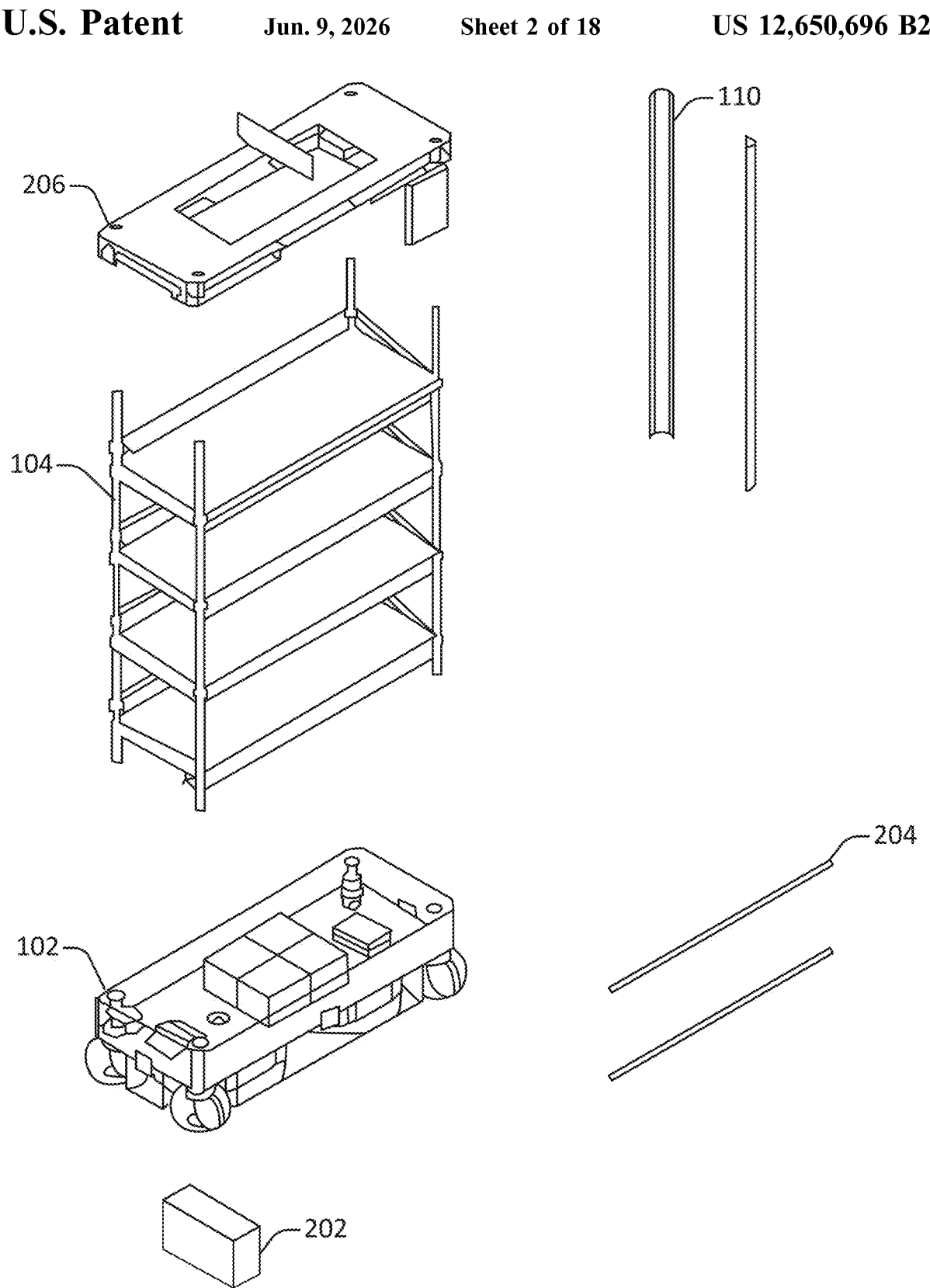
FIG. 2 illustrates a disassembled view of the autonomous mobile robot, configured in accordance with one or more embodiments.

FIG. 2 illustrates a disassembled view of the autonomous mobile robot 100, configured in accordance with one or more embodiments. As shown in FIG. 2, the autonomous mobile robot 100 may be separated into components for easy assembly. For example, the components may be shipped in a disassembled state and assembled on site. The components shown in FIG. 2 are the same as those shown in FIG. 1, with the addition of a charging dock 202 and one or more lighting elements 204. In some embodiments, the autonomous mobile robot 100 may dock with the charging dock 202 to charge a battery included within the base unit 102.

Figures 3A, 3B:
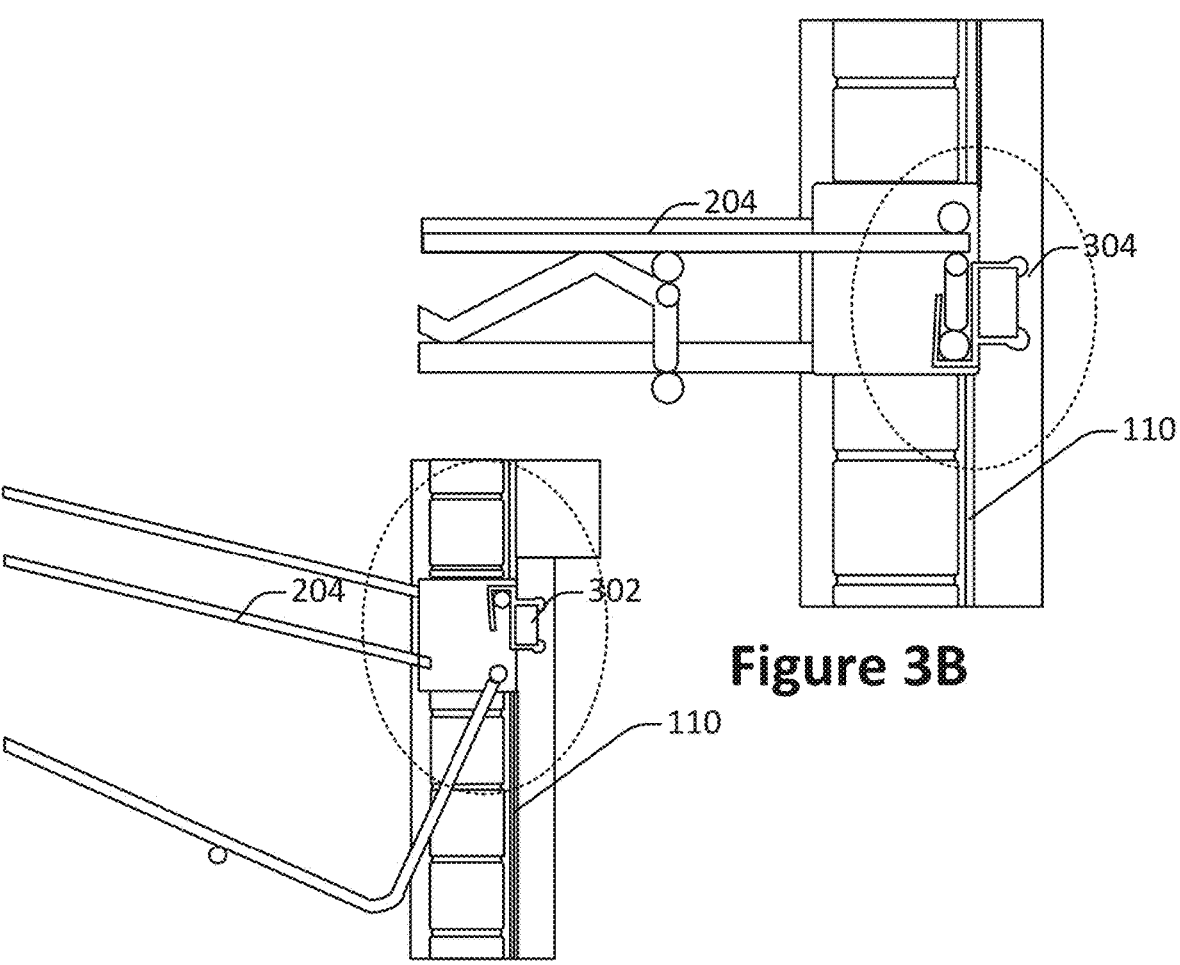
FIG. 3A illustrates a view of an attachment point between a lighting element and a communication channel in an angled shelf configuration.
FIG. 3B illustrates a view of an attachment point between a lighting element and a communication channel in a flat shelf configuration.

FIG. 3A illustrates a view of an attachment point 302 between a lighting element 204 and a communication channel 110 in an angled shelf configuration, while FIG. 3B illustrates a view of an attachment point 304 between a lighting element 204 and a communication channel 110 in a flat shelf configuration. According to various embodiments, the lighting elements 204 may be coupled with the communication channel 110 and may provide lighting in a way that assists in the performance of one or more operations using the autonomous mobile robot 100. For example, the lighting elements 204 may include one or more pick-to-light components that highlight one or more external locations such as a location on a shelf in the physical environment in which the autonomous mobile robot 100 is situated. As another example, the lighting elements 204 may include one or more put-to-light components that highlight one or more internal locations on the autonomous mobile robot 100, such as a tote or shelf region. Such lighting elements may facilitate workflows such as picking items from an external shelf and placing them onto the autonomous mobile robot 100, placing items from the autonomous mobile robot 100 onto an external location such as a shelf or other robot, or the like.

Figure 4:
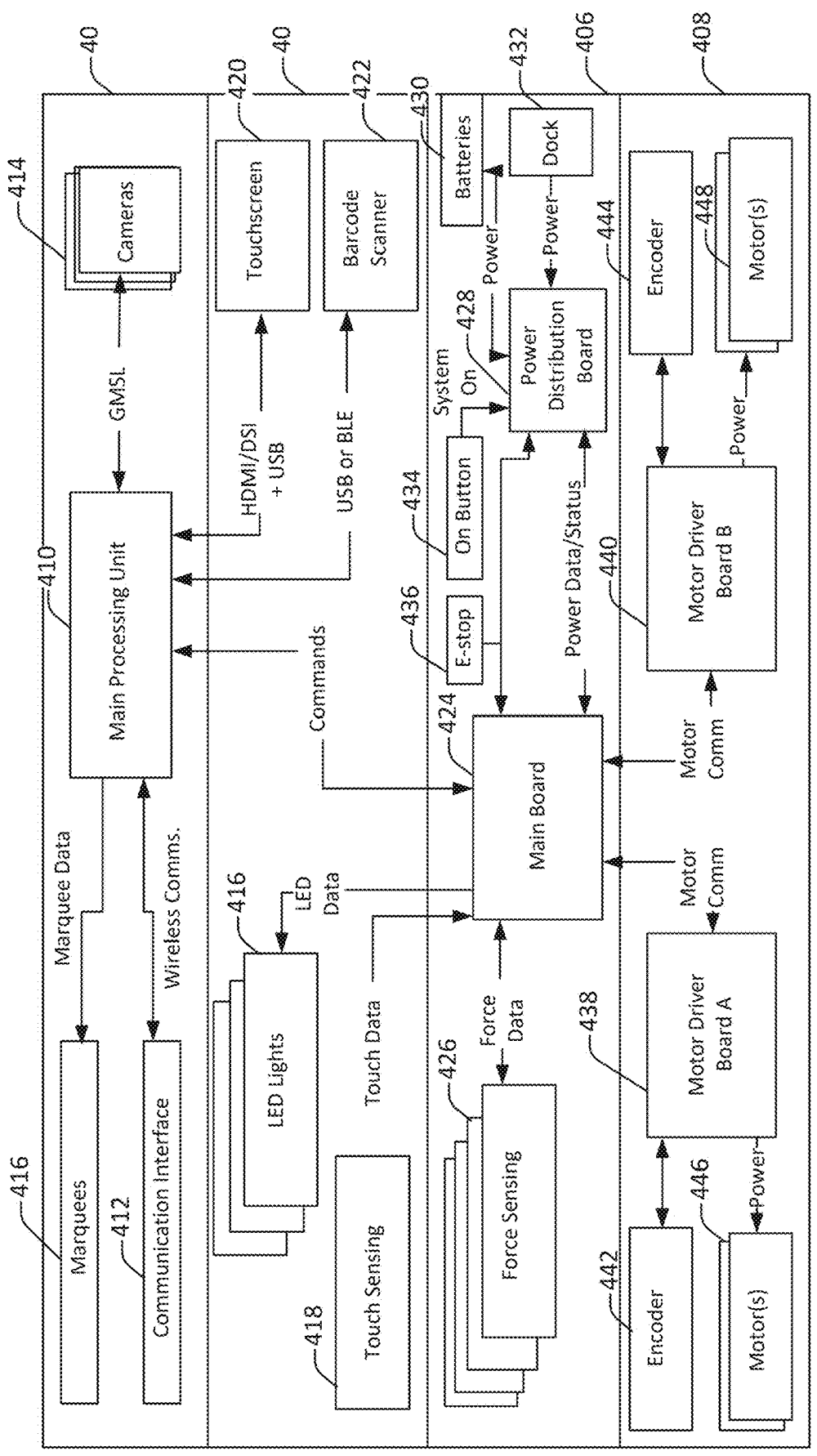
FIG. 4 illustrates a communication architecture diagram of an autonomous mobile robot, configured in accordance with one or more embodiments.

FIG. 4 illustrates a communication architecture diagram 400 of the autonomous mobile robot 100, configured in accordance with one or more embodiments. The communication architecture diagram 400 is conceptually divided into regions. A sensor unit region 402 corresponds with the sensor unit 106. A user interaction region 404 corresponds with the user interaction unit 108. A base unit region 406 corresponds with the base unit 102. A drive unit region 408 corresponds with one or more drive units within the base unit 102.

According to various embodiments, the sensor unit region 402 may include a main processing unit 410, a communication interface 412, one or more sensors 414, and/or one or more marquees 416. The main processing unit 410 may be a computing device such as an AGX Orin provided by Nvidia. The communication interface 412 may include a hardware radio or other device facilitating communication using a communication protocol such as WiFi, Bluetooth, and/or cellular. The sensors 414 may transmit sensor data to the main processing unit.

In some embodiments, the main processing unit 410 may be configured to process and/or instruct the sensors 414. For instance, the main processing unit 410 may be configured to determine a model of a physical environment based on camera data from one or more visible light cameras included in the sensors 414.

According to various embodiments, the base unit region 406 includes a main board 424, which includes one or more processors and/or other components. The main board 424 facilitates communication between and among other components. The base unit region 406 also includes one or more force sensors 426 and a power distribution board 428. The power distribution board 428 communicates with one or more battery systems 430, a power dock interface 432, an on button 434, and an electronic stop interface 436.

According to various embodiments, the user interaction region 404 may include one or more end points for interacting with user interface devices such as one or more touch sensors 418, lighting elements 416, touch screens 420, barcode scanners 422, and/or other such devices. Such devices may communicate with the main processing unit 410 and/or the main board 424.

According to various embodiments, the drive unit region 410 may communicate with motor driver boards 438 and 440 corresponding to different drive units within the autonomous mobile robot 100, which may have one, two, or more drive units. Each drive unit may correspond to one or more wheels, treads, or other mechanisms for locomotion. The motor driver boards may communicate with the encoders 442 and 444 and one or more motors 446 and 448. For instance, the encoders 442 and 444 may be absolute encoders, and the motors 446 and 448 may be brushless DC motors.

The communication architecture diagram 400 is one example of a possible configuration of components within the autonomous mobile robot 100, provided for the purpose of illustration. According to various embodiments, various arrangements and combinations of components may be employed in a manner consistent with techniques and mechanisms described herein.

Figure 5:
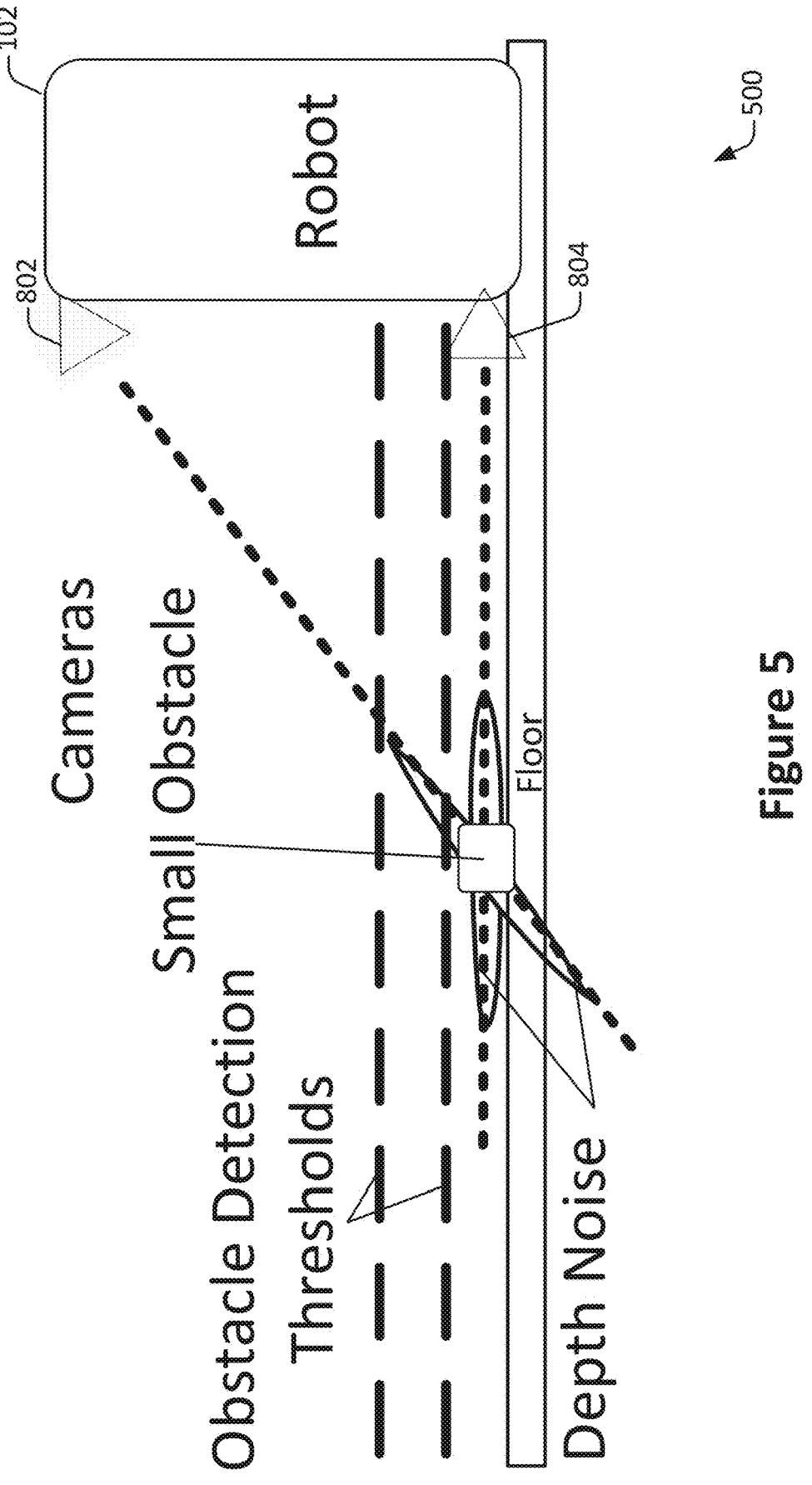
FIG. 5 illustrates a diagram showing sensor placement on an autonomous mobile robot.

In some embodiments, the autonomous mobile robot 100 may be equipped with one or more sensors such as visible light cameras. For instance, FIG. 5 illustrates a diagram 500 showing sensor placement on an autonomous mobile robot 100. Locating a sensor lower on the autonomous mobile robot 100, for instance as shown at the camera 504 in FIG. 5, provides improved obstacle detection for small obstacles located on the floor due to reduced depth noise. In contrast, locating a sensor higher on the autonomous mobile robot 100, for instance as shown at the camera 502 in FIG. 5, provides for improved visibility of people close to the autonomous mobile robot 100 and can avoid creating a blind spot around the base. However, such a configuration can reduce the field of view around the robot and render small objects located on the floor more difficult to detect.

Additional details regarding a mechanical drive unit that may be used in conjunction with techniques and mechanisms described herein are described in U.S. patent application Ser. No. 18/622,640 by Davey et al, filed Mar. 29, 2024, titled "Autonomous Robot Double Drive Assembly", and in U.S. Provisional Patent Application No. 63/561,023 by Davey et al, filed Mar. 4, 2024, titled "Autonomous Robot Double Drive Assembly", both of which are incorporated herein by reference in their entirety and for all purposes.

Handlebars

Figure 6A:
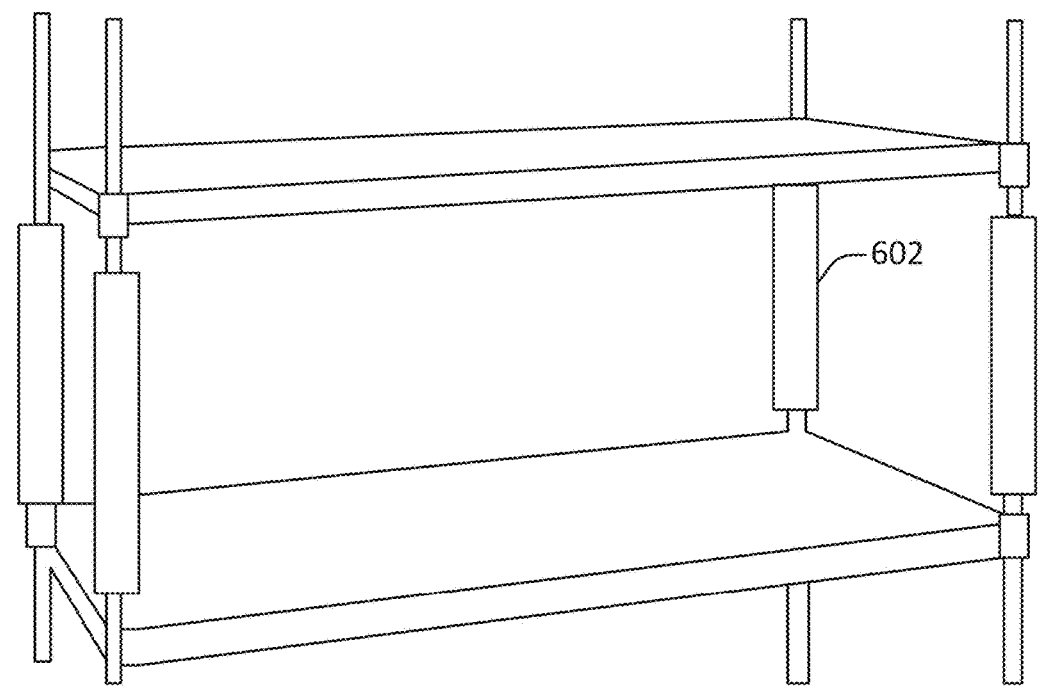
FIG. 6A and FIG. 6B illustrate handlebars for guiding an autonomous mobile robot, configured in accordance with one or more embodiments.
Figure 6B:
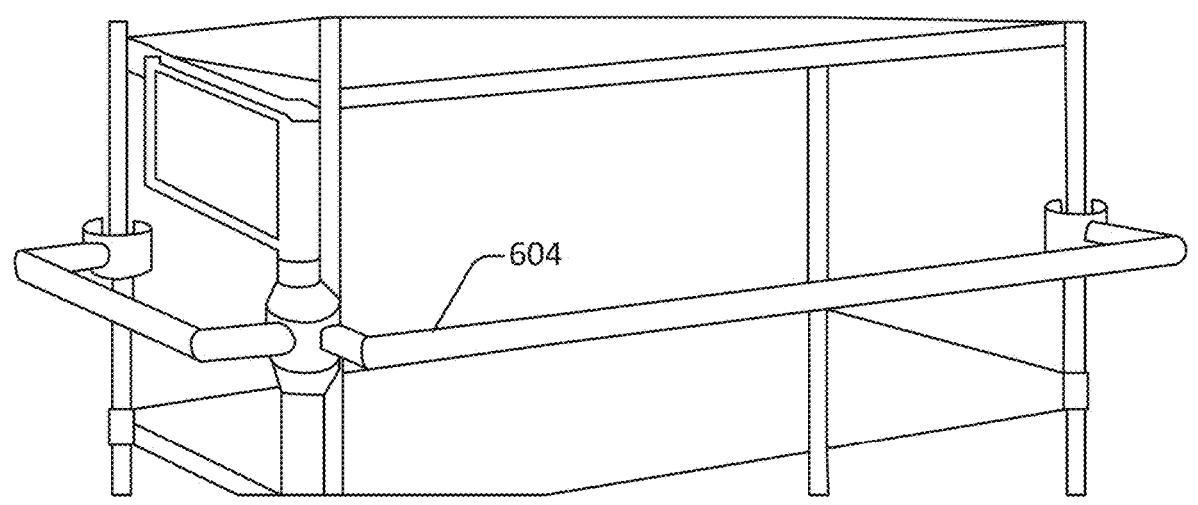

FIG. 6A and FIG. 6B illustrate handlebars for guiding the autonomous mobile robot 100, configured in accordance with one or more embodiments. Depending on the configuration, handlebars may be arranged in any of various ways.

In some embodiments, as shown in FIG. 6A, a handlebar 602 may be arranged in a vertical orientation. Alternatively, or additionally, a handlebar may be arranged in a horizontal orientation, as shown in FIG. 6B. As still another possibility, a handlebar may be arranged in a different orientation, such as at an angle.

In some embodiments, a handlebar 602 may be integrated with the chassis, as shown in FIG. 6A. Alternatively, or additionally, a handlebar 604 may be set off from the chassis, as shown in FIG. 6B.

In some embodiments, an autonomous mobile robot 100 may be equipped with a single handlebar. Alternatively, in some configurations an autonomous mobile robot 100 may be equipped with more than one handlebar, as shown in FIG. 6A and FIG. 6B.

In some embodiments, the handlebars may be used to detect and amplify force applied to the robot. For example, torque as the handlebar is twisted may be detected and used to instruct the drive unit to rotate the robot around the axis of the handlebar. As another example, translational force as the handlebar is pushed may be detected and used to instruct the drive unit to move the robot in the direction of the force, effectively amplifying the force.

FIG. 7 illustrates a force sensor 700, configured in accordance with one or more embodiments. The force sensor 700 may be used to detect force exerted on one or more of handlebars, for instance a handlebar configured as shown in FIG. 6. The force sensor 700 includes a hall effect sensor 702, a spring gasket 704, and one or more magnets 706.

In some embodiments, a bar passes through the spring gasket 704. When force is exerted on the bar and then removed, the spring gasket 704 causes the bar to return to its original central position.

In some embodiments, the one or more magnets 706 may be arranged to as to generate a magnetic field detected by the hall effect sensor 702, which may detect disruptions to the magnetic field corresponding with force exerted in one, two, three, or four dimensions. For instance, the hall effect sensor 702 may detect disruptions to the magnetic field corresponding with force exerted in the x-axis, the y-axis, the z-axis, and/or a rotational force.

In some embodiments, the hall effect sensor 702 may translate the detected disruptions into force sensor data. The force sensor data may identify a direction of the force in one, two, or three translational dimensions and/or a fourth rotational dimensions. Alternatively, or additionally, the force sensor data may identify a magnitude corresponding with a translational and/or rotational force.

According to various embodiments, an autonomous mobile robot may be equipped with any of various kinds of force sensors. Examples of force sensors may include, but are not limited to: Hall effect sensors, optical sensors, capacitive touch sensors, button switch sensors, break beam sensors, force sensitive resistors, and force sensitive switches.

Figure 8:
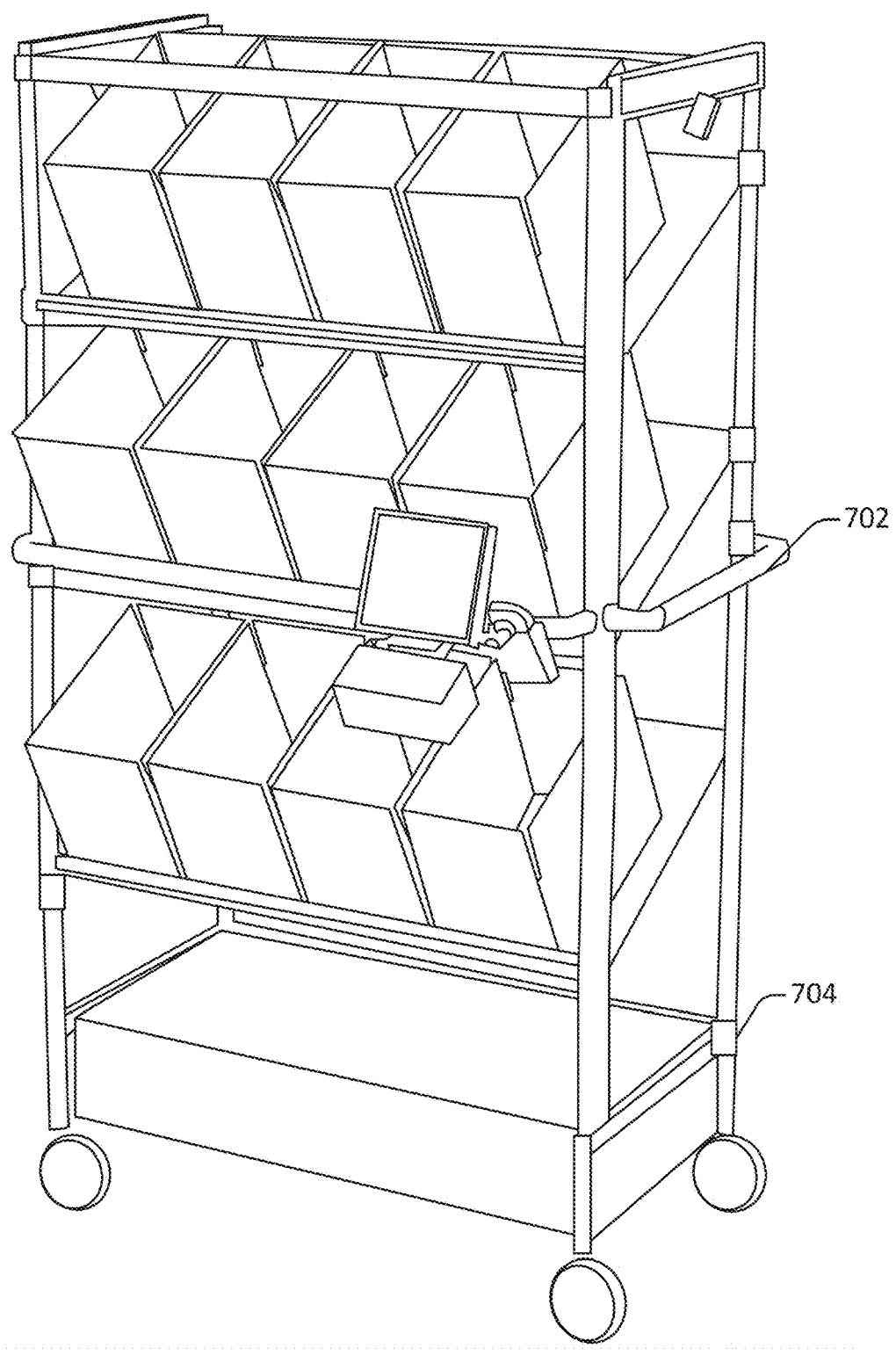
FIG. 8 illustrates another view of the autonomous mobile robot, configured in accordance with one or more embodiments.

FIG. 8 illustrates another view of the autonomous mobile robot 100, configured in accordance with one or more embodiments. FIG. 8 illustrates two different locations at which a force sensor may be configured. At 802, a force sensor may be located at the handlebar itself. At 804, a force sensor may be located at the robot chassis, for instance along a vertical pole included in the chassis.

According to various embodiments, an autonomous mobile robot 100 may be equipped with various numbers and types of force sensors. For example, an autonomous mobile robot 100 may be equipped with force sensors located at some or all of a set of vertical poles included in the chassis and/or at some or all of handlebars coupled with the autonomous mobile robot 100.

In some embodiments, locating a force sensor at the chassis 804 may provide for increased flexibility, since the robot may be grabbed and maneuvered from different sides. However, locating a force sensor at the chassis 804 may cause the user to feel the payload mass when exerting force on the robot, and may increase hysteresis.

In some embodiments, locating a force sensor at the handlebar 802 may hide the payload mass from the user. However, locating a force sensor at the handlebar 802 may limit the user to grabbing the cart from the handlebar.

Additional details regarding force sensing handlebars are discussed in U.S. patent application Ser. No. 18/655,609 by Luong et al, titled Autonomous Robot with Force Sensing User Handlebar, filed May 6, 2024, and in U.S. Provisional Patent Application No. 63/571,352 by Luong et al, titled Autonomous Robot with Force Sensing User Handlebar, filed Mar. 28, 2024, both of which are hereby incorporated by reference in their entirety and for all purposes.

Drive Unit Configuration

Figure 9:
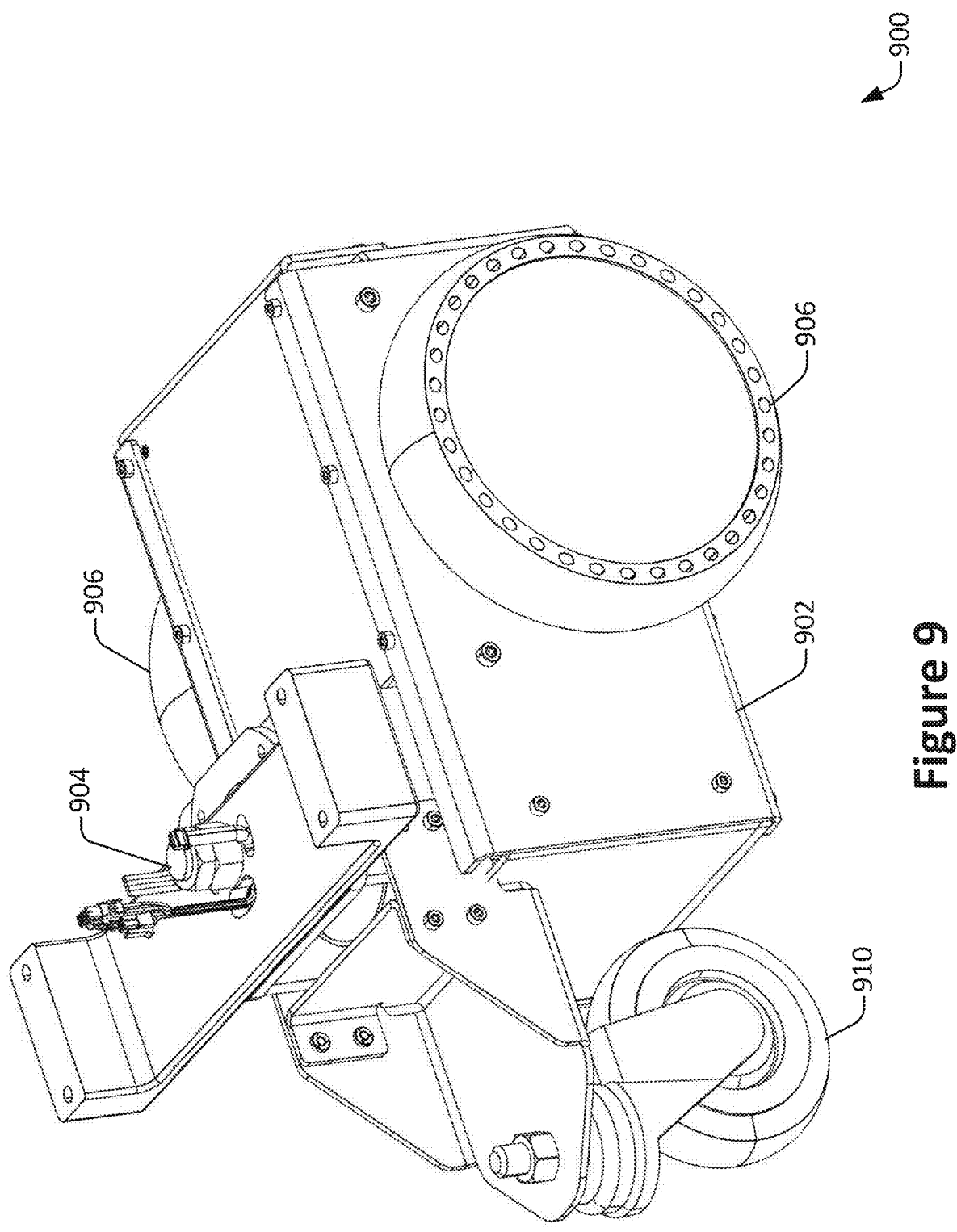
FIG. 9 illustrates a diagram of a drive unit, configured in accordance with one or more embodiments.
Figure 10:
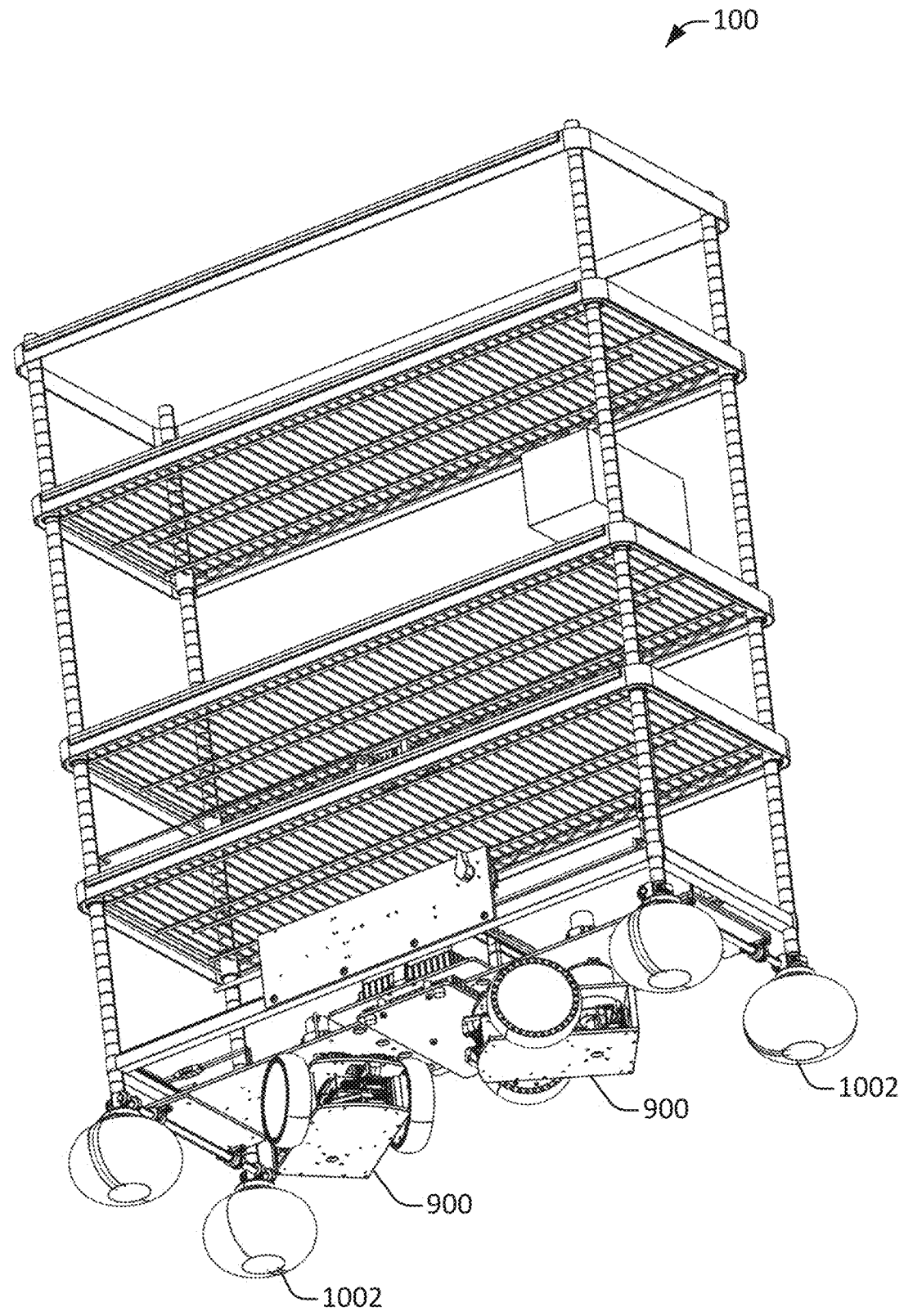
FIG. 10 illustrates a different view of the autonomous mobile robot that includes two drive units.

FIG. 9 illustrates a diagram of a drive unit 900, configured in accordance with one or more embodiments. FIG. 10 illustrates a different view of the autonomous mobile robot 100 that includes two drive units 900.

The drive unit 900 includes a turntable unit 902 that turns about an axis 904. The drive unit 900 also includes one or more wheels 906 and one or more motors. The wheels 906 are offset from the axis 904 and independently controllable via the motor. The motor may power one or more of the wheels using power supplied by a battery, which may be located inside of the drive unit or outside of the drive unit and communicably coupled with the motor, for instance via a slip ring. The drive unit 900 may include one or more unpowered supports, such as the unpowered freely mobile caster wheel 910, for instance to provide additional stability.

In the configuration shown in FIG. 10, each drive unit rotates freely around an axis 904. That is, the rotation around the axis 904 is unpowered. The autonomous mobile robot 100 can be caused to move in any direction or rotated by applying power from the motors to the wheels 906.

In FIG. 10, the autonomous mobile robot 100 is further supported by one or more support elements 1002. For instance, a support element may be a freely spinning and unpowered caster wheel, a slider, or some other component. The support elements may provide additional stability to the autonomous mobile robot 100.

In some embodiments, the autonomous mobile robot 100 may be equipped with multiple support elements 1002. For instance, the autonomous mobile robot 100 may be equipped with four freely spinning and unpowered caster wheels located at approximately the four corners of the autonomous mobile robot 100.

Figures 11A, 11B, 11C:
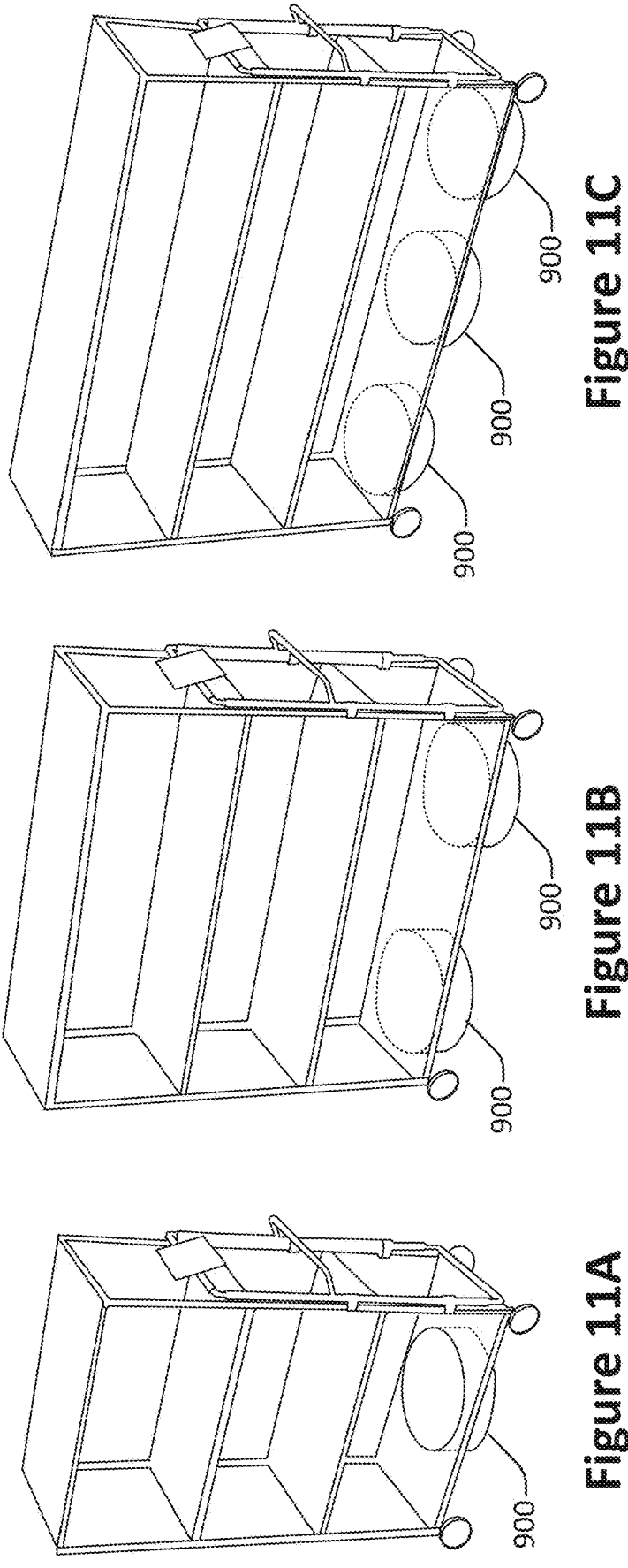
FIG. 11A, FIG. 11B, FIG. 11C, FIG. 12A, FIG. 12B, and FIG. 12C show additional views of the autonomous mobile robot.

According to various embodiments, an autonomous mobile robot 100 may be equipped with one or more of the drive unit 900. For example, FIG. 11A illustrates a configuration that includes a single drive unit, FIG. 11B illustrates a configuration that includes a double drive unit, and FIG. 11C illustrates a configuration that includes a triple drive unit. In some implementations, including more than one drive unit may include performance on one or more dimensions. For instance, moving from a single drive unit to a double drive unit may increase back drivability, decrease torque requirements, decrease the number of unique parts, and decrease the diameter needed for each of the drive units.

In some embodiments, the autonomous mobile robot 100 may be equipped with one or more drive units of a different type from that shown, such as one or more drive units that employ one or more Mecanum wheels.

Figures 12A, 12B, 12C:
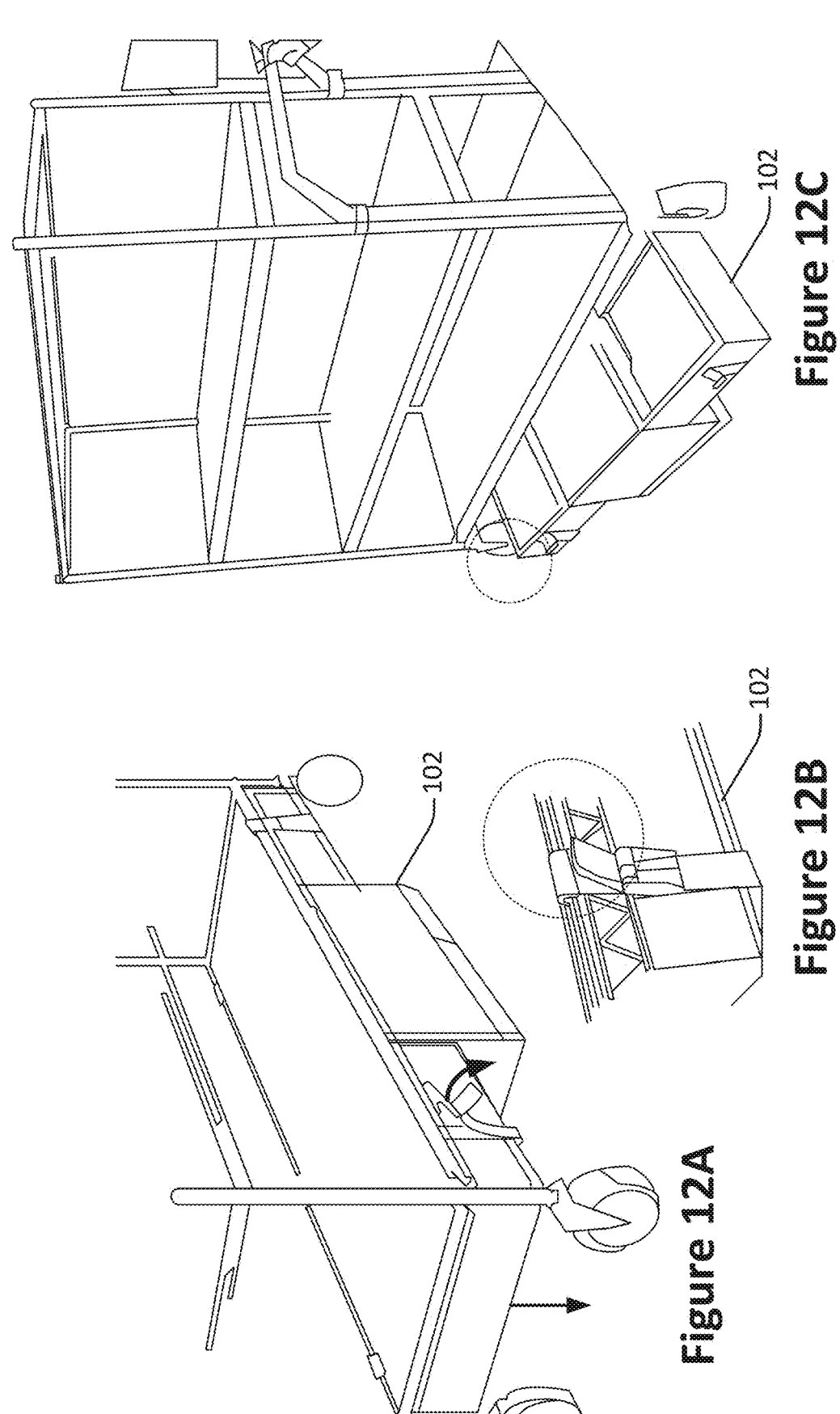

In some implementations, a base unit 102 may be removable from the autonomous mobile robot 100. For instance, in FIG. 12A, FIG. 12B, and FIG. 12C, the base unit 102 is shown being removed from the autonomous mobile robot 100.

Autonomous Mobile Robot Operation

Figure 13:
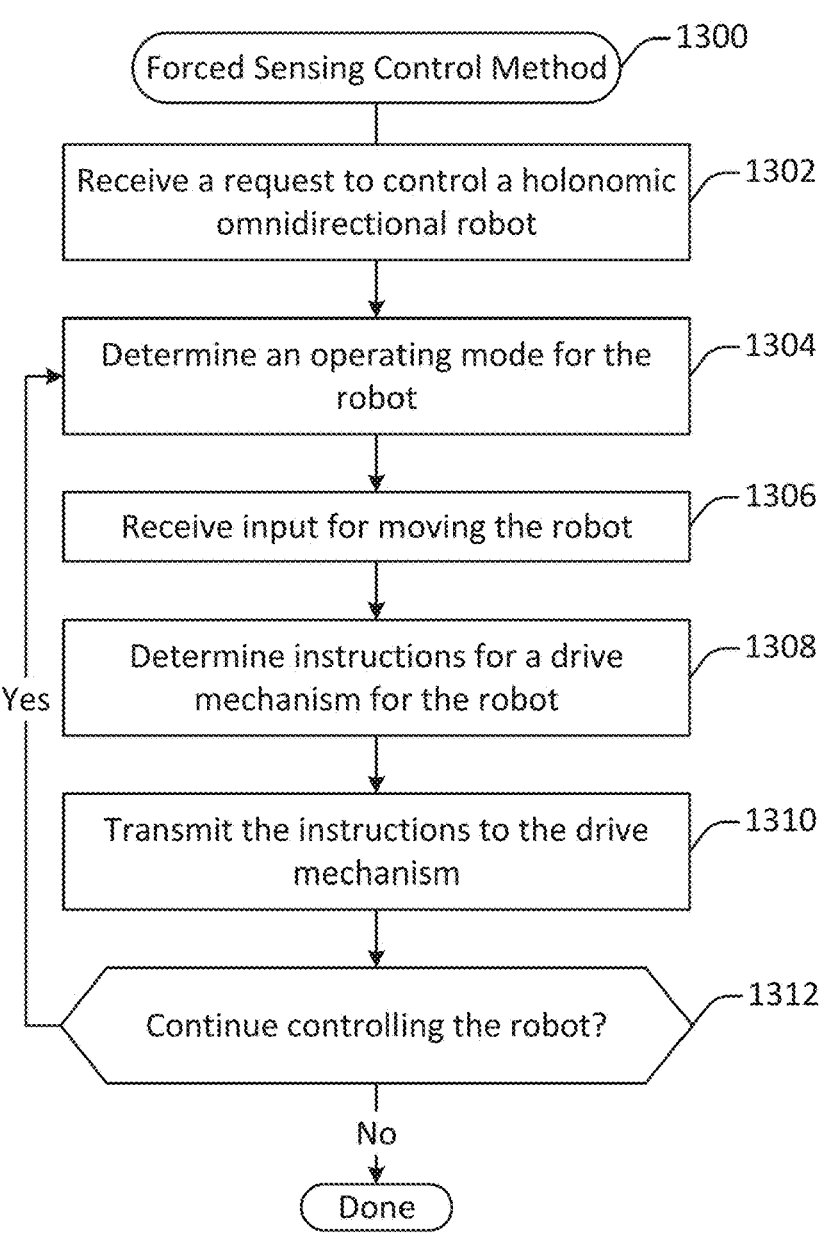
FIG. 13 illustrates a method of forced sensing control of an autonomous mobile robot, configured in accordance with one or more embodiments.

FIG. 13 illustrates a method 1300 of forced sensing control of an autonomous mobile robot, configured in accordance with one or more embodiments. The method 1300 may be performed at a holonomic and omnidirectional configured as described herein.

At 1302, a request to control an autonomous mobile robot is received. In some embodiments, the request may be generated automatically at a main processing unit or other controller of the robot, for instance during an initialization process.

An operating mode for the robot is determined at 1304. According to various embodiments, an autonomous mobile robot may be configured for operation in various modes, such as forced sensing, autonomous movement, unforced sensing, and/or other modes. In some embodiments, the mode may be determined based on user input. For example, a user may touch or approach the robot to remove it from autonomous movement mode. As another example, a user may activate a button or touch screen to place the robot into forced sensing mode. In some embodiments, the mode may be determined based on instructions received via a communication interface. For instance, the robot may receive an instruction from a fleet controller to enter or leave autonomous mode. As yet another example, the robot may detect when the operator has let go, for instance via one or more capacitive, tactile, and/or force sensing sensors.

Input for moving the robot is determined at 1306. In some embodiments, the input may be received via a user interface at the robot, such as a force sensing handlebar. Alternatively, the input may be received via a communication interface, for instance from a fleet controller.

Instructions for a drive mechanism for the robot are determined at 1308. The instructions are transmitted to the drive mechanism at 1310. The instructions may cause the robot to move in a particular direction. As discussed herein, various types of instructions are possible based on various types of input.

In some embodiments, an autonomous mobile robot in force sensing mode may move in a direction of force exerted by an operator on a force sensing handlebar. For example, the robot may detect a translational direction, rotational direction, and/or magnitude of force, and then direct the drive unit to move the robot in the direction. The robot may be configured such that the operator need only apply a small amount of force despite the robot carrying a heavy load, with the robot effectively magnifying that force to move in the requested direction. According to various embodiments, various types of modifications and constraints may be applied to such a force sensing motion configuration.

In some embodiments, force may be applied asymmetrically, for instance braking much more easily than accelerator. Further, the robot may sense its surroundings and adapt its instructions for safety and/or damage avoidance. For example, the robot may slow to a stop before striking a person or object, moving down a ramp, or entering a hole. As another example, the robot may slow to a stop when it detects that the operator is no longer touching the robot.

A determination is made at 1312 as to whether to continue controlling the robot. According to various embodiments, the robot is controlled until it is deactivated.

Figure 14:
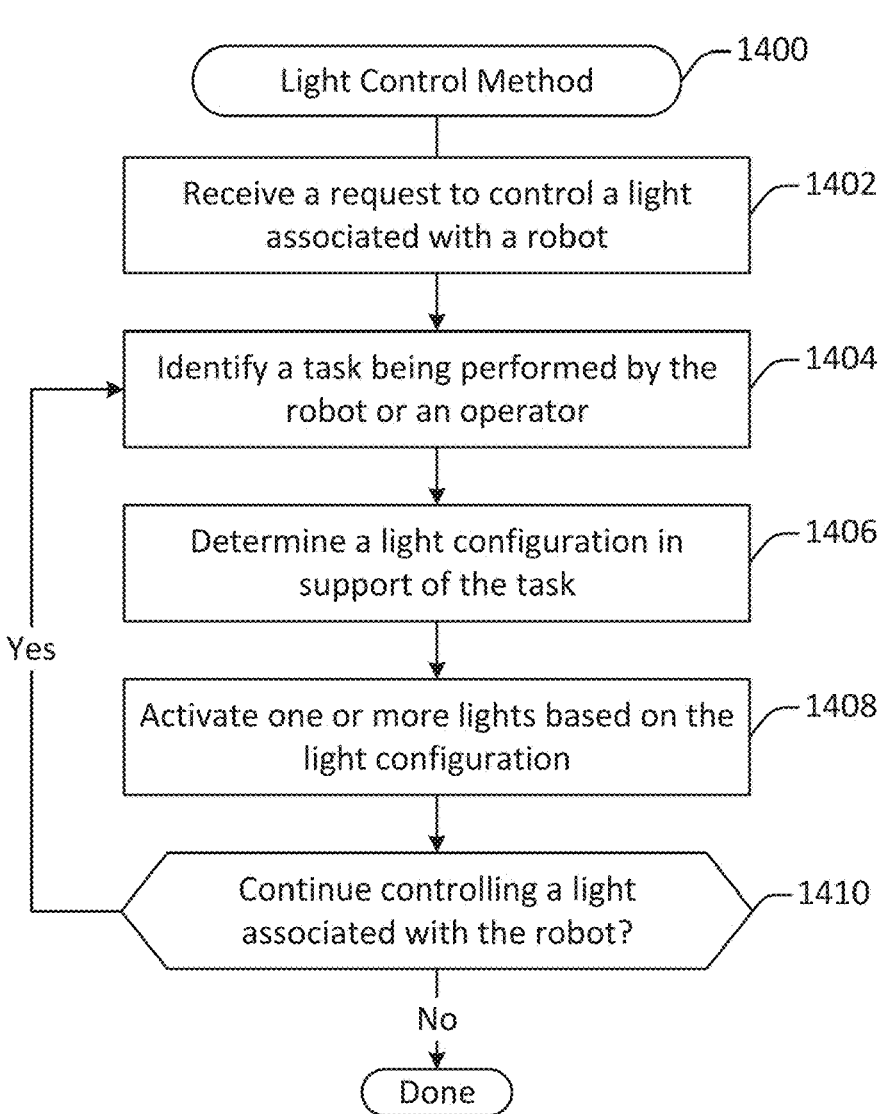
FIG. 14 illustrates a method for autonomous motion control of an autonomous mobile robot, performed in accordance with one or more embodiments.

FIG. 14 illustrates a method 1400 for autonomous motion control of an autonomous mobile robot, performed in accordance with one or more embodiments. The method 1400 may be used to direct an autonomous mobile robot to perform a task, for instance by aiding an operator.

A request to autonomously control an autonomous mobile robot in a physical environment is received at 1402. In some embodiments, the request may be received when the robot enters an autonomous mode, as discussed with respect to operation 1304.

A scene graph of the physical environment is determined at 1404. In some embodiments, the scene graph may provide a virtual representation of a physical environment. For instance, a scene graph of a warehouse may provide a virtual representation of aisles in the warehouse, along with locations of items, zones for dropping off items, and the like. The scene graph may be connected to one or more data sources, for instance allowing the robot to determine a correspondence between an item to be picked up or dropped off and a location in the physical environment. For example, a database may indicate that Item A134 is located in Bin 14 on Shelf 10 of Aisle 9, and the scene graph may provide a virtual representation location of Bin 14, Shelf 10, Aisle 9 in a way that allows the robot to navigate to that location.

In some embodiments, the scene graph may be received from a remote computing device. For instance, the scene graph may be received from a fleet controller configured to control multiple robots. Alternatively, or additionally, elements of the scene graph may be determined by the robot itself. For instance, the robot may analyze sensor data to determine or supplement a scene graph.

A current location for the robot on the scene graph is determined at 1406. According to various embodiments, the location of the robot may be determined in any of various ways. For example, image data from one or more cameras at the robot may be analyzed using a visual SLAM and/or other techniques to determine a location of the robot relative to one or more reference points. A correspondence between a reference point and the scene graph may then allow the robot to determine its location on the scene graph.

A task to perform is determined at 1408. A destination location on the scene graph is determined at 1408 based on the task. A route from the current location to the destination location is determined at 1410 based on the scene graph. The robot is instructed to move at 1410 based on the movement instruction. According to various embodiments, the particular task, location, and movement instruction may depend in significant part on the application.

In some embodiments, the robotic cart may be configured to aid in the completion of a task in a warehouse. For example, the robot may be configured to aid in a task such as item picking in which it retrieves one or more items from storage in the warehouse for transport to another location. As another example, the robot may be configured to aid in a task such as item replenishment in which it delivers one or more items to one or more locations within the warehouse for future picking. As still another example, the robot may be configured to aid in another task, such as transporting a person, transporting a production input, transporting a production output, providing a mobile light source, monitoring a region, monitoring a person, removing trash, or the like.

In some embodiments, item picking may be performed using any of a variety of protocols. For example, in zone picking, a person may operate in an area of the warehouse to pick items while one or more robots travel to the person to collect those items. As another example, in batch picking, the robot may be equipped with one or more boxes, some or all of which may include items corresponding with multiple orders. As still another example, an autonomous mobile robot may be configured to follow a person as the person moves around a warehouse environment and places items into the robotic cart. As yet another example, an autonomous mobile robot may be configured to facilitate order consolidation, in which it moves to a location close to another robot and supports the movement of items between the two carts.

In some embodiments, in support of these tasks, the robot may use lights or other affordances to interact with humans. For example, a light strip may include lights that may be adapted to a width of a region on a cart. The lights may then be activated to indicate to a human where to remove an item from or where to place an item on the cart.

In some embodiments, a task for the robot to perform may be determined by a coordinator such as a fleet management system providing command and control instructions for a fleet of robots. In such a configuration, the fleet management system may perform route determination and/or optimization. For example, the fleet management system may spread the load to avoid traffic congestion, determine estimates for task completion time, and/or generally determine tasks in a manner that efficiently utilizes multiple robots.

A determination is made at 1412 as to whether to continue controlling the robot. According to various embodiments, the robot may continue to be controlled as long as it remains in autonomous motion mode.

Figure 15:
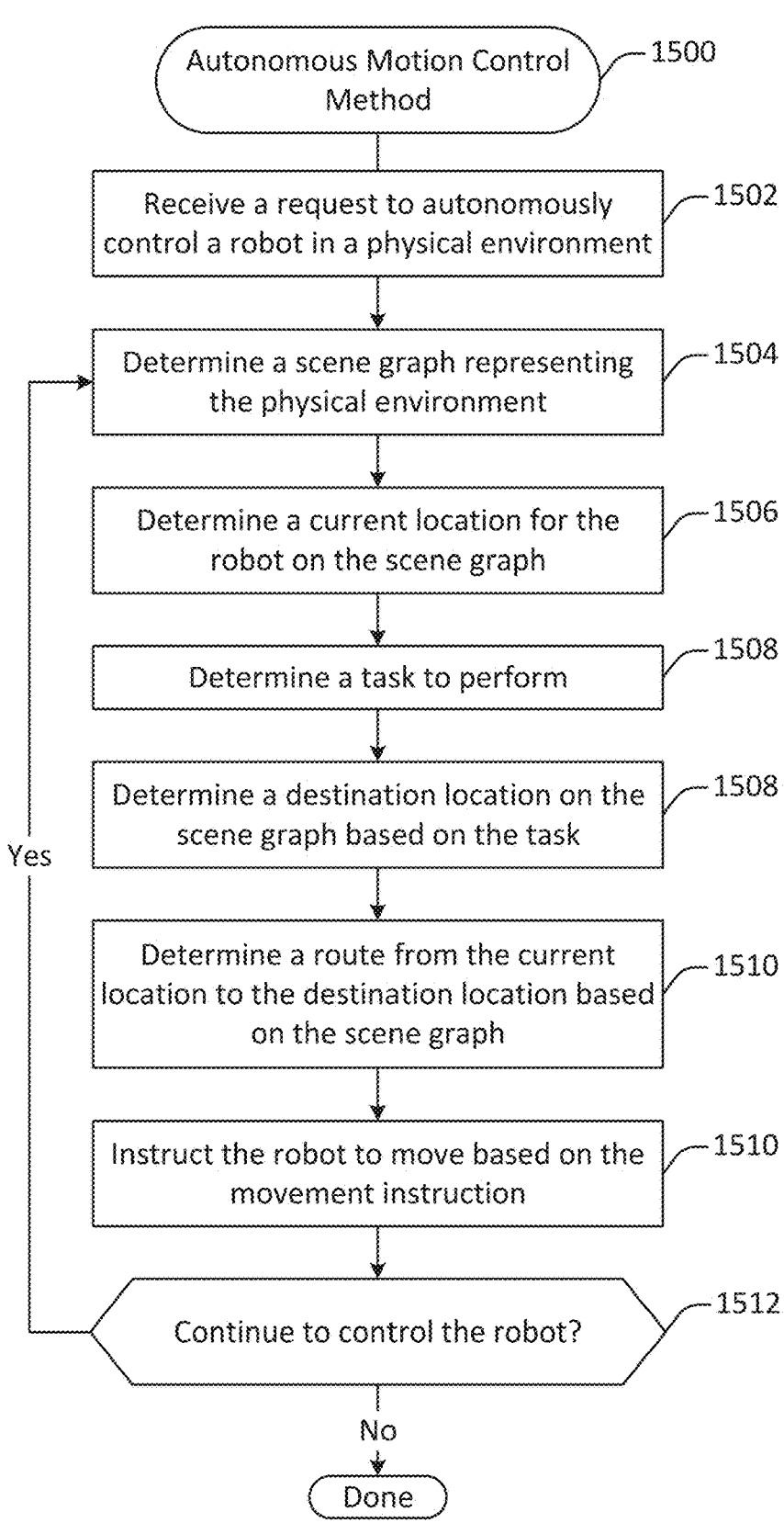
FIG. 15 illustrates a method for controlling one or more lights associated with an autonomous mobile robot, performed in accordance with one or more embodiments.

FIG. 15 illustrates a method 1500 for controlling one or more lights associated with an autonomous mobile robot, performed in accordance with one or more embodiments. A request to control a light associated with an autonomous mobile robot is received at 1502. A task being performed by the robot or an operator is identified at 1504. A light configuration in support of the task is determined at 1506. One or more lights are activated based on the light configuration at 1508. A determination is made at 1510 as to whether to continue to control a light associated with the robot.

According to various embodiments, the method 1500 may be used to configure various types of lights. For example, the robot may be equipped with projectors that can project light onto a surface inside the robot, such as onto a shelf location. For example, the robot may be equipped with projectors that can project light onto a surface off of the robot, such as onto a bin located on a shelf in a warehouse aisle. As still another example, the robot may be equipped with a light strip that can highlight an area of an autonomous mobile robot, such as a region of a shelf. A light may be configured as a laser beam on a gimbal, a laser line, and addressable LED strip, a fixed light whereby the robot moves the light by aligning the robot with the shelf, and/or any other suitable lighting configuration.

According to various embodiments, the method 1500 may be used to configure various types of lighting operations. For example, the robot may be configured to light up an area or container corresponding with where an item is to be picked up from or moved to. For instance, the robot may project a light onto an external bin corresponding to an item to be picked up and then instruct an addressable LED strip to light up an area on the robotic car where the item is to be placed.

Robot Control Processes and Architecture

Figure 16:
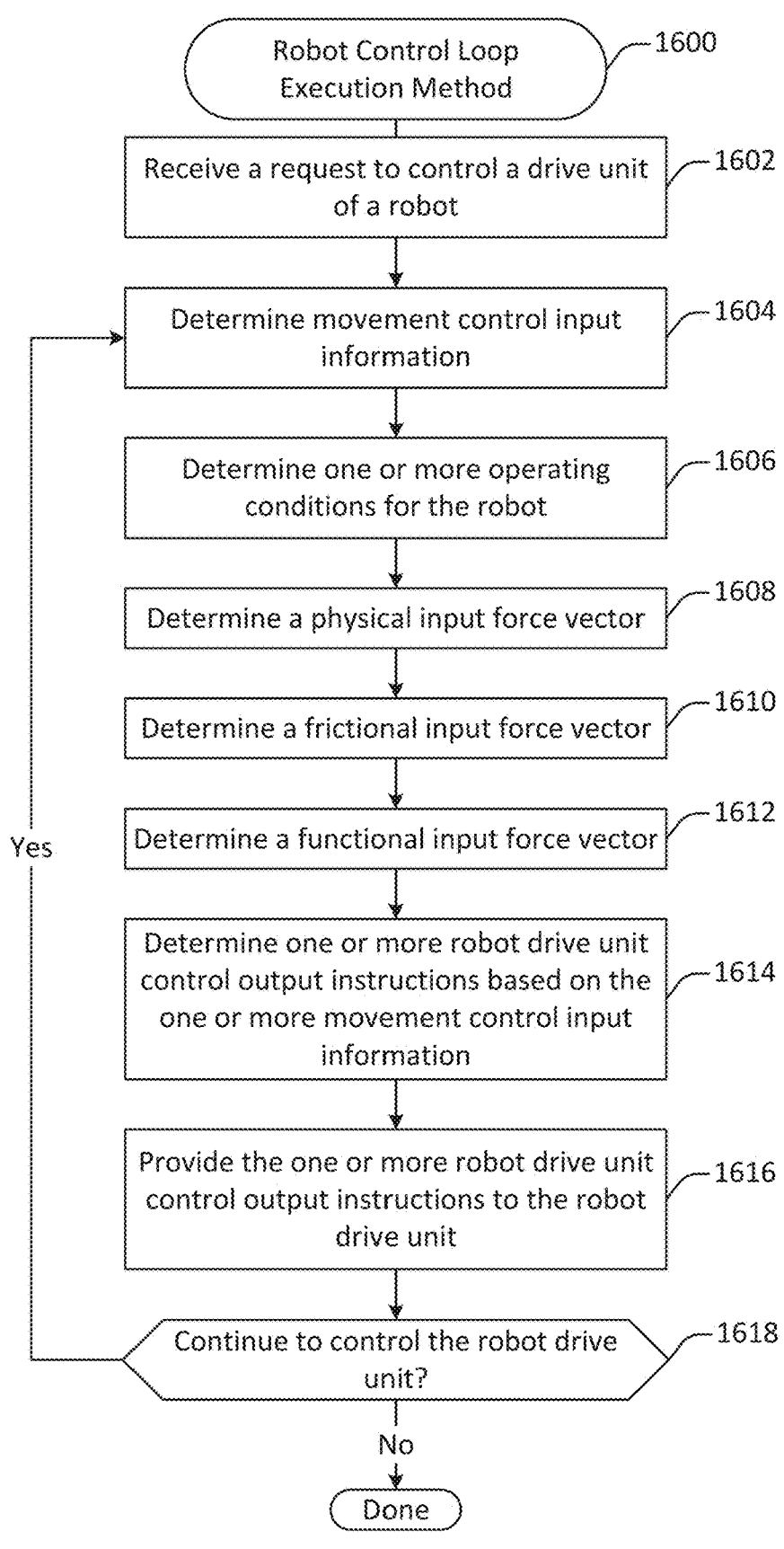
FIG. 16 illustrates a method for executing a robot control loop, performed in accordance with one or more embodiments.

FIG. 16 illustrates a method 1600 for executing a robot control loop, performed in accordance with one or more embodiments. The method 1600 may be used to determine instructions for providing to a robot drive unit for the purpose of causing the robot to move through space.

The method 1600 is described with reference to FIG. 17, which illustrates an architecture diagram for a control portion of a mobile robot configured in accordance with one or more embodiments. The architecture diagram includes drive control input sources 1702 through 1704, which may provide input to a robot drive controller 1706. The robot drive controller 1706 may determine output instructions for a robot drive unit 1710 and may provide the output instructions to the robot drive unit 1710 via a robot drive unit abstraction layer 1708. The method 1600 may be performed at the robot drive controller 1706, which in some embodiments may be implemented at the main board 424 shown in FIG. 4.

According to various embodiments, the method 1600 may be used with any of various types of robots and/or drive systems. Some examples of such robots and drive systems are discussed with respect to FIGS. 1-15. However, the method 1600 may be used in conjunction with various types of robots and/or drive systems. For example, suitable robots may or may not be autonomous, omnidirectional, and/or backdrivable.

A request to control a drive unit of a robot is received at 1602. In some embodiments, the request may be generated when the robot is activated and enters a mode in which it is controllable. The robot may be controlled based on one or more of user input, autonomous decision-making, and/or remote instructions received via a network interface from a remote system such as a fleet controller.

Movement control input information is determined at 1604. According to various embodiments, the movement control input information may include various types of input received from any of various sources, such as the sources 1702 through 1704 shown in FIG. 17. For example, the movement control information may include user input received from a user input device such as a force sensor, joystick, or other control device. For instance, the force sensor may be attached to a force sensing handlebar as discussed throughout the application. As another example, the movement control information may include one or more configuration parameters such as a force multiplier, a virtual friction coefficient, an indication of an operating mode, or the like. As yet another example, the movement control information may include one or more functional control parameters. For instance, the robot may be operating in a mode such that it behaves as if it is moving between virtual rails.

According to various embodiments, the drive unit of the robot may be controlled at least in part by transmitting an instruction determined based on user input received at a force sensor at the robot. For instance, when force is detected at a force sensing handlebar, the robot may be moved in the direction of the force. In general, a relatively larger force detected at the force sensor may correspond with a relatively higher velocity or force applied to the robot drive unit. The term "force multiplier" as used herein refers to any alteration applied to the user input to strengthen or weaken the relationship between the input force received at the force sensor and the force instruction sent to the drive unit. For a given input force, for example, a relatively larger force multiplier would yield a relatively larger increase in velocity. As discussed throughout the application, the force multiplier may be a fixed or configurable scalar, vector, or force output function that receives as inputs one or more parameters including data from the force sensor.

One or more operating conditions for the robot are determined at 1606. In some embodiments, the one or more operating conditions may include any conditions that may affect the robot's handling and control. Examples of such operating conditions may include, but are not limited to: the identity of an operator using the robot, a location of the robot, a direction in which the robot is traveling, an amount of traffic in the vicinity of the robot, a condition associated with the physical environment in which the robot is situated, and the like. For example, the detection of a potentially unsafe condition such as a wet surface may cause all robots to be placed in a safety mode in which a lower force multiplier is applied.

In some embodiments, information about operating conditions may be determined by the robot itself. For instance, the robot may detect the presence of a wet surface based on a loss of traction in the drive unit. Alternatively, or additionally, such information may be received via a communication interface, for instance from a fleet controller. As still another possibility, a user may provide input indicating one or more operating conditions.

A physical input force vector is determined at 1608. In some embodiments, the physical input force vector may be determined based on user input. The force sensor force vector may identify values for force exerted in one or more dimensions at one or more force sensors. For instance, a user may provide input by exerting force on a handlebar connected with the robot. As one example, the force sensor force vector may identify values for translational and rotational forces applied to a force sensor attached to a handlebar at the robot.

In some embodiments, the force sensor force vector may identify values for force exerted in one or more dimensions at one or more force sensors. For instance, the force sensor force vector may identify values for translational (e.g., an x-dimension and a y-dimension) and rotational forces applied to a force sensor attached to a handlebar at the robot.

In some embodiments, forces may be quantified in a coordinate system. In some configurations, the coordinate system may be parameterized relative to the robot. For instance, the x-direction may be treated as "forward" while the y-direction is treated as "sideways". Alternatively, the coordinate system may be parameterized relative to the physical environment. For instance, the x-direction may be treated as "north" or as a particular direction within a building.

In particular embodiments, determining the physical input force vector may involve imposing one or more types of smoothing. For example, the system may impose a "dead band" around zero force. In such a configuration, the robot may ignore small amounts of force applied to the force sensor. In this way, the robot may be prevented from drifting when very little force is being applied to the force sensor. Thus, small amounts of force may be mechanically treated as zero force. As another example, the system may smooth force over time, for instance to avoid jitter.

In some embodiments, one or more smoothing operations may be applied in a dimension-specific manner. For instance, if a non-trivial force is being applied in the forward direction but only a trivial amount of force is being applied in the rotational direction, then the non-trivial forward movement force may be accounted for in the physical input force vector while the trivial rotational force is ignored. In this way, a user may be able to easily move the robot in one dimension without the robot drifting in another dimension. Alternatively, one or more smoothing operations may be applied in a dimensionless manner. For instance, if the sum of the magnitudes of the dimension-specific forces is non-trivial, then all forces may be accounted for in the physical input force vector.

A frictional input force vector is determined at 1610. In some embodiments, the friction forces may be applied in the direction opposite to velocity in each dimension. For instance, if the robot is rotating clockwise and moving in a forward direction, then the friction force input vector may be vector with values applying force in an anticlockwise and backward direction. The current direction of movement may be determined based on the operating conditions determined at 1606.

According to various embodiments, a frictional input force vector may be composed of various components. The frictional input force vector may be determined by aggregating these components, for instance by summing them. Examples of components that may be included in a frictional input force vector include, but are not limited to: Coulomb friction, damping friction, static friction, dynamic friction, other types of friction, and/or combinations thereof.

In some embodiments, as discussed above, a Coulomb friction component may be applied. For instance, the Coulomb friction force vector may be constant in the direction against motion. The Coulomb friction may, for instance, cause the robot to slow down over time absent user input. The particular values used for Coulomb friction may depend on a variety of factors, such as the weight of the robot. For instance, a Coulomb friction coefficient between 0.01 and 0.25 may be applied by multiplying the coefficient by the weight of the robot.

In some embodiments, as discussed above, a damping friction component may be applied. For instance, the damping friction vector may be proportional to velocity in the direction against motion. The damping friction vector may, for example, limit the top speed of the robot in any direction. The damping friction vector may also help to reduce stability concerns, for instance in the event that a robot impacts an obstacle and then rebounds sharply in the opposite direction. In some configurations, a damping friction coefficient between 0.5 and 2.0 may be applied by multiplying the coefficient by the weight of the robot.

A functional input force vector is determined at 1612. According to various embodiments, the functional input force vector may be used to supply force based on functional considerations such as safety, obstacle avoidance, and/or other operational goals.

In some embodiments, the functional input force vector may be used to guide the robot to a particular location or along a particular route within an environment. For example, the functional input force vector may include a virtual magnet force that pulls the robot along a route or to a designated location provided as input. For instance, the functional input force vector may be used to move the robot along a route through an environment, effectively guiding the operator along. However, the operator may be able to override the functional input force by, for instance, exerting a sufficiently strong physical force in a different direction.

In some embodiments, the functional input force vector may be used to guide the robot safely within an environment. For example, to facilitate obstacle avoidance, the functional input force vector may include a virtual repellant force that causes walls, people, and/or other obstacles to effectively push back against the robot. As another example, the functional input force vector may include virtual rumble strips that vibrate the robot under one or more operating conditions.

In some embodiments, the functional input force vector may be used to enforce a speed limit. For example, the functional input force vector may include a component that pushes back in a direction against velocity to prevent the robot from attaining a speed greater than designated maximum. The designated maximum speed limit may change depending on one or more considerations, such as the robot's location within an environment.

In some embodiments, the functional input force vector may be used to provide virtual haptic rails or virtual train rails. Haptic rails may be modeled as a virtual track along which the robot tries to maintain alignment. Moving the robot off of the virtual corridor may require user input such as sharp torque to the handlebar to "pop" the robot off of the rail. At the moment of leaving the rail, the robot may apply a sharp impulse such as a pop or a step in velocity to simulate leaving a track.

In some embodiments, haptic rails or virtual train rails may be defined in any of various ways. For example, the robot may project rails onto the ground via a projector. As another example, haptic rails, virtual train rails, and/or areas of particular speed zones may be detected by a robot based on, for instance, tape or paint applied to a region of the ground.

In some embodiments, the functional input force vector may be used to simulate dynamic rails that lead the operator in a particular direction. For instance, the operator may be guided to move the robot along a virtual track, with movement along the track requiring much less force to the handlebars than movement in a different direction. The rails may be sharp or soft, and may be narrow or wide, depending on the application.

According to various embodiments, the location of virtual rails or obstacles or the initialization of a strafing mode may be determined in various ways. For example, environment detection may involve input from a visual SLAM, inertial measurement unit, or other such data source. As another example, such a mode may be detected based on user input or one or more configuration parameters. For instance, the robot may automatically enter a strafing mode when it enters an aisle. As still another example, virtual rails may be created based on lines painted or projected on the floor. Alternatively, the robot may project rails onto the floor that match the virtual rails being used by the robot.

In some embodiments, the functional input force vector may be used to assist in smooth obstacle avoidance. For instance, the robot may use the functional input force vector to simulate a repelling and/or dampening force when approaching an obstacle, finally slowing to a stop without hitting the obstacle and despite user input on the handlebars pushing the robot in the direction of the obstacle. The functional input force vector may be used to introduce jitter simulating a rumble strip when moving toward an obstacle or other area where the robot determines that it should not travel.

In some embodiments, the functional input force vector may be used to provide haptic feedback via one or more motors in a drive unit on the robot. The strength of the haptic feedback and/or the force needed to operate the robot may be adapted for the individual. The identity of the individual may be determined based on an identifier such as a badge, a bar code, an RFID tag, or other such indicator. Alternatively, or additionally, the adaptation may rely on an estimation of strength as a function of the user's size or force exerted on the robot.

In some embodiments, the functional input force vector may be used to model the inertia of the device and then change that inertia as experienced by the user. Such a model may be used, for instance, to make the robot seem lighter in rotation than an unpowered robot would be given its mass, or to move the effective center of rotational mass backward toward the operator to simulate a "shopping cart" feeling. As still another example, the functional input force vector may be used to lock the orientation of the robot into a "strafing mode". In the strafing mode, the robot may align its orientation with an aisle, grid, user, or other reference point. A strafing mode may be used to simulate inertia based on a direction. For instance, the robot may snap to a virtual grid but effectively provide a preference for a longitudinal axis. In such a configuration, the strafing mode may help to avoid drift down a long straightaway. Similarly, the robot may seem to be lighter in the preferred direction, with motion in a different direction requiring higher activation force.

In some embodiments, the functional input force vector may include a component damping motion in a direction lateral to the front of the robot. For example, such a component may be used, for instance, to facilitate smooth motion in the direction intended by the operator. For instance, such a force may facilitate smooth turning by increasing the force in the direction in which the robot is pointing.

In some embodiments, the functional input force vector may include multiple components. For example, the functional input force vector may include a combination of functional input force vector components corresponding with (1) haptic rails, (2) a speed limit, (3) a navigation objective, and/or any other elements.

In some embodiments, one or more components of a functional input force vector may be determined subject to one or more constraints. For example, an obstacle avoidance force component, a speed limit force, and/or other such forces may be limited to operating in a direction opposed to velocity.

In some embodiments, an unforced sensing mode may allow the robot to be moved without force detection. However, moving a heavy omnidirectional object without activating a drive mechanism can be difficult due to the challenge in changing inertia, such as when turning a corner. To address such a challenge, the functional input force vector may be used to simulate virtual fixed wheels at a point in the robot, making the robot more easily turnable in the unforced sensing model. In some configurations, the location of the virtual fixed wheels may be configurable or adjusted automatically, for instance being moved based on physical slide being detected.

In some embodiments, the functional input force vector may be applied in an unforced sensing mode for safety and/or convenience purposes. For instance, forward force may be applied to compensate for friction. As another example, stopping force may be applied whenever acceleration over a given threshold is detected.

In some embodiments, a mobile robot may lock to orientation, for instance in strafing mode or when following an operator. When locking orientation, the robot may resist attempts to rotate the robot. For instance, applying force to one corner of the robot in a way that would normally cause the robot to rotate may lead to the robot applying a virtual force to another corner to maintain the orientation. Such locking may occur even in an unforced sensing mode, for instance by measuring displacement, wheel movement, inertia, and/or other such sensor values.

In some embodiments, the functional input force vector may depend at least in part on configuration settings that may be adapted to the user. For example, a user may "level up" with experience to allow the use of additional features. As another example, some features may be disabled, depending on the application or area in which the robot is operating. As still another example, an operator or fleet manager may activate or disable one or more features.

In some implementations, the functional input force vector may include one or more elements received from a remote computing device, such as a fleet controller. The one or more elements may include force vector components to be included in the functional input force vector, a function to calculate such components, a goal to be used in calculating such components, and/or other suitable information.

One or more robot drive unit control output instructions are determined at 1614 based on the one or more movement control input instructions. In some embodiments, a movement control output instruction may be provided to the robot drive unit to cause the robot drive unit to apply force to the robot. The movement control output instruction may be determined by combining different types of movement control input information into an instruction capable of being acted upon by the robot drive unit.

According to various embodiments, a movement control output instruction may be specified as a vector in one or more dimensions. For instance, a vector may include different directional components corresponding to movement in the x-direction, the y-direction, and the rotational direction with the robot being positioned on a virtual x-y plane corresponding with the physical environment in which the robot is situated. A directional component may indicate a magnitude associated with movement in the indicated dimension. The magnitude may be indicated as, for instance, a value corresponding with a velocity or a force.

Various techniques may be used to determine the one or more robot drive unit control output instructions. Additional details regarding such techniques are discussed with respect to the method 1800 shown in FIG. 18.

The one or more robot drive unit control output instructions are provided to a drive unit for the robot at 1616. In some embodiments, the robot drive unit control output instructions may be provided to an abstraction layer for the robot, such as the abstraction layer 1708 shown in FIG. 17. The abstraction layer may provide separation between: (1) the determination of how the robot should move; and (2) the control of the hardware components of the drive unit to achieve that movement. In this way, the same controller logic may be applied to different physical configurations of drive units.

Figure 17:
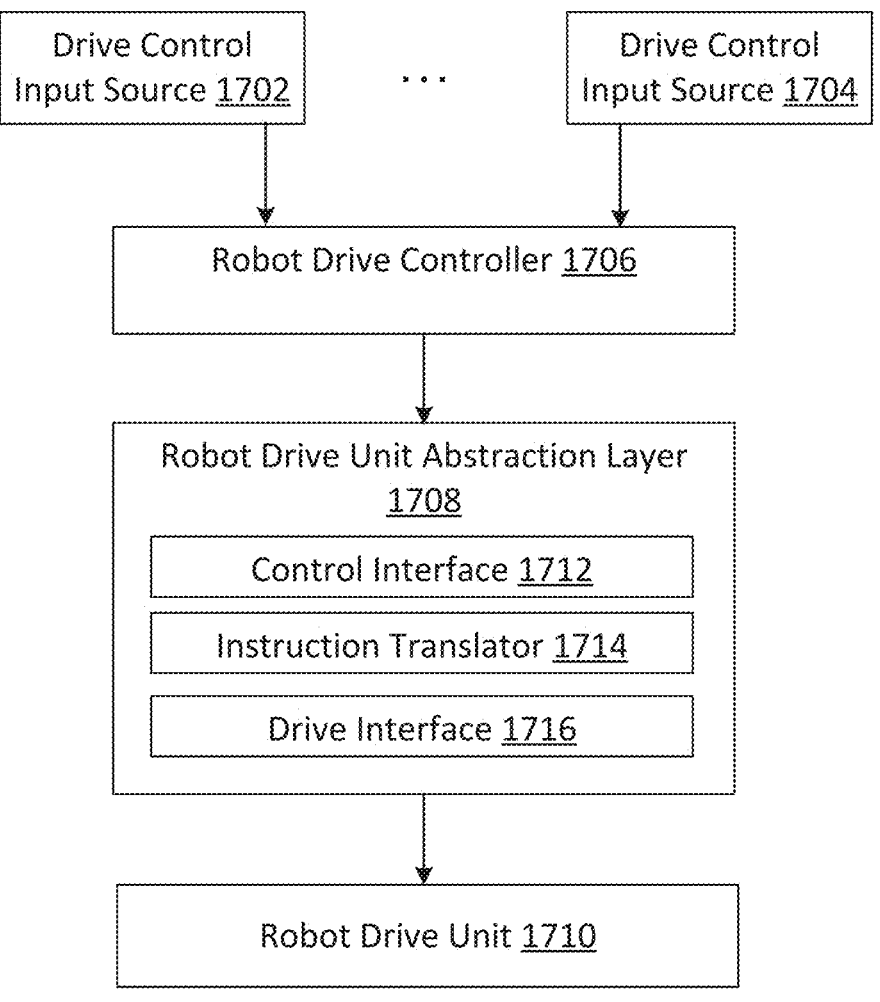
FIG. 17 illustrates an architecture diagram for a control portion of a mobile robot configured in accordance with one or more embodiments.

As shown in FIG. 17, the robot drive unit abstraction layer 1708 includes a control interface 1712, an instruction translator 1714, and a drive interface 1716. The control interface 1712 receives the control instructions from the robot controller 1706. The instruction translator 1714 translates those control instructions into hardware-level instructions executable by the robot drive unit 1710. The drive interface 1716 then provides those control instructions to the robot drive unit 1710. For instance, the robot drive controller 1706 may issue a control output instruction to the robot drive unit abstraction layer 1708 through the control interface 1712 effectively instructing the drive unit to move with force magnitude (f1, f2, f3) in the (x, y, r) direction. The instruction translator 1714 may then translate that control output instruction into individual motor-level instructions to one or more motors included in the drive unit 1710, such as motors corresponding to different wheels.

Returning to FIG. 16, a determination is made at 1618 as to whether to continue to control the robot drive unit. According to various embodiments, the robot drive unit may continue to be controlled until a terminating condition is met. For example, control may be terminated when the robot enters a deactivated state, an error condition, a charging mode, or another situation in which movement is not indicated.

According to various embodiments, the operations 1604 through 1618 may be performed with any suitable frequency. For instance, this control loop may operate at a rate between the range of 25 hertz to 2 kilohertz.

FIG. 18 illustrates a method 1800 for determining a robot control output instruction, performed in accordance with one or more embodiments. The method 1800 may be performed at the robot drive controller 1706 shown in FIG. 17. The robot control output instruction may be specified in accordance with the control interface 1712 of the robot drive unit abstraction layer 1708. For instance, the robot control output instruction may be specified as a vector identifying values corresponding to magnitude of either force or velocity in one or more dimensions.

A request to determine one or more robot control output instructions is received at 1802. In some embodiments, the request may be generated in the course of executing a robot control loop. For instance, the request may be generated as discussed with respect to operation 1606 shown in FIG. 16.

A determination is made at 1804 as to whether to provide velocity-based control instructions. In some embodiments, the robot may be controlled by directing the drive unit to move the robot in accordance with a vector that specifies velocity values along one or more dimensions. Alternatively, the robot may be controlled by directing the drive unit to move the robot in accordance with a vector that specifies force values along one or more dimensions.

In some embodiments, the robot may operate entirely in one mode or another. For instance, the robot may be configured to operate entirely in a force-based control mode or a velocity-based control mode. Alternatively, the mode may be dynamically determined based on one or more considerations such as user input, operating conditions, payload weight, location, and/or communication with a remote computing system such as a fleet controller.

According to various embodiments, the determination made at 1804 may reflect one or more tradeoffs. For instance, employing velocity-based controls for a robot may allow the robot to operate with a constant apparent mass to the user, regardless of the actual mass of the robot and any load carried by the robot. However, a velocity-based control approach may create a counterintuitive situation in which the forces exerted on the robot that are not detected by the force sensor are effectively counteracted through the application of the velocity-based control logic since the robot drive unit is controlled so as to match the target velocity. Employing instead a force-based control through the use of a force multiplier may allow the robot to take into account forces exerted on the robot that do not act through the force sensor. However, loading the robot with an increased cargo mass will result in the operator feeling the additional mass in the absence of dynamic adjustment to the force multiplier, discussed in greater detail below.

Upon determining to apply a force-based control instruction, a force multiplier is determined at 1806. In some embodiments, the force multiplier may include one or more values applied as a multiplier to the force sensor force vector to determine control instructions for the robot. In this way, a user may move the robot in a particular direction by applying a force potentially much smaller than what would be required to move the robot in the direction were no force assistance provided.

In some embodiments, the force multiplier may be implemented as a scalar. In such a configuration, the same force multiplier may be applied to all dimensions. Alternatively, the force multiplier may be implemented as a vector. In such a configuration, different dimensions may receive different force multiplication. For example, the rotational dimension may be associated with a larger force multiplier due to the difficulty (relative to translational force) of applying rotational force to an input device such as a handlebar.

In some embodiments, the force multiplier may be fixed. For instance, a force multiplier of 1.5×, 2×, 3×, or another suitable value may be used. Alternatively, the force multiplier may be dynamically determined. For instance, the force multiplier may be increased or decreased based on the operating conditions optionally determined at 1606. In some configurations, the force multiplier may be determined based at least in part on configuration information provided by a fleet administrator and/or robot user.

In some embodiments, a force multiplier may be increased relative to a previously used and/or default value. As an example, a lower force multiplier may be used: (1) when the robot is located in an area designated for slower speed, (2) when a potentially unsafe condition is detected, (3) when a larger or stronger operator is using the robot, (4) when the robot has been manually configured to have a lower force multiplier, (5) when the robot has been detected as carrying less mass, and/or (6) when any other type of operating condition designated for use with a lower force multiplier is detected.

In some embodiments, a force multiplier may be increased relative to a previously used and/or default value. For example, a higher force multiplier may be used (1) when the robot is located in an area designated for higher speed, (2) when it is determined that the robot is operating in an area of low traffic, (3) when the robot has been manually configured to have a higher force multiplier, (4) when the robot has been detected as carrying more mass, when a smaller or weaker operator is using the robot, and/or (5) when any other type of operating condition designated for use with a higher force multiplier is detected.

In some embodiments, a force multiplier may depend on the direction of the physical force relative to a current velocity of the robot. For example, a higher force multiplier may be used when the physical force is in the opposite direction as the velocity. In this way, an operator may be able to slow or stop the robot more easily than the operator can increase the robot's speed. In some configurations, such determinations may be made on a dimension-by-dimension basis. For instance, in a situation in which the robot is moving in the x-direction while rotating counterclockwise, a physical force applied clockwise and in the x-direction may receive a higher force multiplier in the rotational direction than in the translational direction since the rotational physical force is against the direction of velocity while the translational force in the same direction as the velocity.

In some embodiments, a force multiplier may depend on the location of the robot relative to the operator. For example, a larger force multiplier may be used when moving the robot in a direction away from the operator than when moving the robot in a direction toward the operator. In this way, the robot may be safely accelerated away from the robot while at the same time preventing the operator from inadvertently cause the robot to unsafely accelerate toward the operator.

An updated physical input force vector is determined at 1808. In some embodiments, the physical input force vector may be determined by multiplying the physical input force vector determined at 1608 by the force multiplier determined at 1806.

An output force vector is determined at 1810 based on the input force vectors. In some embodiments, the output force vector may be determined by combining the updated physical input force vector determined at 1806 (i.e., $k \cdot F_{sensed}$, where k is the force multiplier and $F_{sensed}$ is the force detected at the force sensor(s)) with the frictional input force vector determined at 1610 (i.e., $F_{friction}$) and the functional input force vector determined at 1612 (i.e., $F_{functional}$. For instance, the various input force vectors may be summed to determine the output force vector. That is, $F_{applied} = k \cdot F_{sensed} + F_{friction} + F_{functional}$.

Upon determining instead to provide velocity-based control instructions, a virtual mass value for the robot is identified at 1812. By causing the robot to move at a velocity consistent with the virtual mass value when acted upon by a force applied to the robot by a user, the virtual mass value may be used to cause the robot to feel as if it weighs a particular amount.

In some embodiments, the virtual mass may be specified as a configuration value. In some configurations, the virtual mass may be fixed. For instance, a robot may be assigned a virtual mass of 60 pounds. Alternatively, the virtual mass may be dynamically determined. For example, the virtual mass value may be increased for users identified as being relatively larger and/or stronger. As another example, the virtual mass value may be dynamically determined based on observations about user input over time.

An acceleration vector for the robot is determined at 1814 based on the force vector and the virtual mass. In some embodiments, the acceleration vector may be determined by dividing the force vector by the virtual mass. Under Newton's second law of motion, the acceleration of an object is equal to the force applied to the object divided by the object's mass. Thus, $$a = \frac{F_{sensed} + F_{friction} + F_{functional}}{m}$$

where m is the virtual mass and a is the acceleration vector.

A velocity output vector for the drive unit is determined at 1816. In some embodiments, the velocity output vector may be determined based on the formula $v_t = v_{t-1} + \alpha \cdot \Delta t$, where $v_{t-1}$ is the current velocity vector for the robot, $\alpha$ is the acceleration vector for the robot, and $\Delta t$ is the time interval for one iteration of the drive unit control loop. Thus, the velocity output vector may be obtained by integrating the acceleration vector over a suitable period of time.

In some embodiments, the current velocity vector may be identified as a vector in dimensions corresponding to those of the acceleration vector determined at 1814. The current velocity vector may be determined as part of the operating conditions determined at 1606. For instance, one or more sensors associated with the drive unit may provide sensor data indicating the velocity at which the robot is currently traveling.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of industrial autonomous mobile robots configured for operation in a warehouse settings. However, the techniques of the present invention apply to a wide variety of autonomous mobile robots configured for operation in a wide variety of settings. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method for controlling a robot including an omnidirectional mechanical drive unit, the method comprising:
   receiving from a force sensor an input message characterizing a physical force exerted on the force sensor in a first direction;
   determining via a processor a physical force input vector based on the input message and quantifying the physical force in two or more dimensions;
   determining via the processor a force output vector aggregating the physical force input vector and a second force input vector, the force output vector quantifying a force to apply to move the robot in a second direction, wherein determining the force output vector includes: (a) determining a velocity vector including one or more velocity values each characterizing a current velocity of the robot in a respective dimension, (b) based on the velocity vector, identifying a designated dimension in which the current velocity of the robot is directionally opposed to the physical force input vector, (c) increasing a force multiplier in the designated dimension, and (d) applying the force multiplier multiplying the physical force input vector;
   transmitting an indication of the force output vector to the omnidirectional mechanical drive unit via a communication interface; and
   moving the robot via the omnidirectional mechanical drive unit in the second direction based on the force output vector.

2. The method recited in claim 1, wherein the second force input vector includes a friction force input vector characterizing a virtual frictional force exerted in a third dimension opposing the first direction.

3. The method recited in claim 1, wherein the second force input vector includes a functional force input vector characterizing a virtual functional force to be exerted on the robot in a third direction based on one or more instructions.

4. The method recited in claim 1, wherein the second force input vector includes a virtual force exerted in a third direction opposing an obstacle located in a physical environment in which the robot is situated.

5. The method recited in claim 4, the method further comprising:
   detecting the obstacle based on sensor data received from one or more sensors located at the robot.

6. The method recited in claim 1, wherein the second force input vector includes a virtual force exerted in a third direction along a path determined based on an instruction received from a remote computing system.

7. The method recited in claim 1, wherein the second force input vector includes a virtual force exerted in a third direction toward a location in a physical environment in which the robot is situated.

8. The method recited in claim 1, wherein transmitting the indication of the force output vector to the omnidirectional mechanical drive unit comprises transmitting the force output vector to the omnidirectional mechanical drive unit.

9. The method recited in claim 8, wherein determining the force output vector comprises summing the second force input vector and a dot product of the physical force input vector and the force multiplier.

10. The method recited in claim 1, wherein transmitting the indication of the force output vector to the omnidirectional mechanical drive unit comprises determining a velocity output vector based on an existing velocity vector for the robot, the velocity output vector identifying a target velocity to be achieved by the omnidirectional mechanical drive unit.

11. The method recited in claim 1, wherein the force sensor is communicably coupled with a handlebar attached to the robot and oriented in a vertical direction.

12. The method recited in claim 1, wherein the force sensor includes a Hall effect sensor configured to detect a change in a magnetic field.

13. The method recited in claim 1, wherein the two or more dimensions include two translational dimensions along a planar surface orthogonal to gravity.

14. The method recited in claim 1, wherein the force multiplier is a function that receives as input information determined based on the physical force input vector.

15. The method recited in claim 1, wherein the omnidirectional mechanical drive unit is backdrivable.

16. The method recited in claim 1, wherein the force multiplier is a vector in the two or more dimensions.

17. A robot comprising:
   a force sensor configured to transmit an input message characterizing a physical force exerted on the force sensor in a first direction;
   a processor configured to:
      determine a physical force input vector based on the input message, the physical force input vector quantifying the physical force in two or more dimensions, and
      determine a force output vector aggregating the physical force input vector and a second force input vector, the force output vector quantifying a force to apply to move the robot in a second direction, wherein determining the force output vector includes: (a) determining a velocity vector including one or more velocity values each characterizing a current velocity of the robot in a respective dimension, (b) based on the velocity vector, identifying a designated dimension in which the current velocity of the robot is directionally opposed to the physical force input vector, (c) increasing a force multiplier in the designated dimension, and (d) applying the force multiplier multiplying the physical force input vector; and an omnidirectional mechanical drive unit configured to receive an indication of the force output vector and move the robot in the second direction based on the force output vector.

18. One or more non-transitory computer readable media having instructions stored thereon for performing a method for controlling a robot including an omnidirectional mechanical drive unit, the method comprising:

receiving from a force sensor an input message characterizing a physical force exerted on the force sensor in a first direction;

determining via a processor a physical force input vector based on the input message and quantifying the physical force in two or more dimensions;

determining via the processor a force output vector aggregating the physical force input vector and a second force input vector, the force output vector quantifying a force to apply to move the robot in a second direction, wherein determining the force output vector includes: (a) determining a velocity vector including one or more velocity values each characterizing a current velocity of the robot in a respective dimension, (b) based on the velocity vector, identifying a designated dimension in which the current velocity of the robot is directionally opposed to the physical force input vector, (c) increasing a force multiplier in the designated dimension, and (d) applying the force multiplier multiplying the physical force input vector;

transmitting an indication of the force output vector to the omnidirectional mechanical drive unit via a communication interface; and moving the robot via the omnidirectional mechanical drive unit in the second direction based on the force output vector.

* * * * *